United States Patent
Kawade et al.

(10) Patent No.: US 8,012,018 B2
(45) Date of Patent: Sep. 6, 2011

(54) GAME APPARATUS AND STORAGE MEDIUM STORING GAME PROGRAM

(75) Inventors: Ryota Kawade, Kyoto (JP); Tadao Nakayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1245 days.

(21) Appl. No.: 11/408,070

(22) Filed: Apr. 21, 2006

(65) Prior Publication Data
US 2007/0202949 A1    Aug. 30, 2007

(30) Foreign Application Priority Data

Feb. 27, 2006    (JP) ................... 2006-049778

(51) Int. Cl.
*A63B 71/00* (2006.01)
(52) U.S. Cl. .......................... 463/32; 463/30
(58) Field of Classification Search ............. 463/31, 463/30, 32, 33; 345/419, 433, 473; 382/293
See application file for complete search history.

(56) References Cited

U.S. PATENT DOCUMENTS

| | | | |
|---|---|---|---|
| 6,050,896 A | 4/2000 | Hanado et al. | |
| 6,128,018 A | 10/2000 | Nakajima | |
| 6,326,963 B1 * | 12/2001 | Meehan | 345/419 |
| 6,343,987 B2 * | 2/2002 | Hayama et al. | 463/1 |
| 2004/0219980 A1 * | 11/2004 | Bassett et al. | 463/33 |

FOREIGN PATENT DOCUMENTS

| | | |
|---|---|---|
| JP | 2001-321562 | 11/2001 |
| JP | 2002-085829 | 3/2002 |

OTHER PUBLICATIONS

Super Mario 64 Otasuke Guide, First edition, published by Soft Bank Co. Ltd., on Sep. 7, 1996, pp. 48 and 49.
Super Mario Brothers Urawaza Taizensyu, 19-th edition, Futami Shobo Co. Ltd, on Mar. 31, 1986, pp. 4 and 5.

* cited by examiner

*Primary Examiner* — Masud Ahmed
(74) *Attorney, Agent, or Firm* — Nixon & Vanderhye PC

(57) ABSTRACT

A video game apparatus includes a CPU, and the CPU executes a game according to a game program in a virtual space. During the game, the player selectively displays a 2D game screen and a 3D game screen by operating a controller. It should be noted that a player character, etc. is subjected to a modeling process in a virtual three-dimensional space, and the image is photographed by a virtual camera so as to be displayed as a 2D or 3D game screen on a monitor. If it is determined whether or not the player character and the predetermined object are contacted with each other, collision data for 2D display or collision data for 3D display set in advance to the object is utilized.

11 Claims, 15 Drawing Sheets

(A)

(B)

GAME APPARATUS AND STORAGE MEDIUM STORING GAME PROGRAM

CROSS REFERENCE TO RELATED APPLICATION

The disclosure of Japanese Patent Application No. 2006-049778 is incorporated herein by reference.

TECHNICAL FIELD

The exemplary embodiments disclosed herein relate to a game apparatus and a storage medium storing game program. More specifically, the exemplary embodiments disclosed herein relate relates to a game apparatus which has an operating means with which a player performs an operation input, a display means for displaying a game image, and storage means for storing in advance data to generate at least a virtual three-dimensional space, and a storage medium storing game program.

BACKGROUND AND SUMMARY OF THE INVENTION

One example of a related art is disclosed in "Super Mario 64 Otasuke Guide", First edition, published by Soft Bank Co. Ltd., on Sep. 7, 1996, on page 48 and 49. According to this document, a player operates a hero character (player character) to move the player character on a map developed in a three-dimensional space, and conquers the game by attacking an enemy character, and so forth.

Another example of the related art is disclosed in "Super Mario Brothers Urawaza Taizensyu", the 19-th edition, Futami Shobo Co. Ltd, on Mar. 31, 1986, on page 4 and 5. According to this document, an initial video game is proposed, in which a player character moves in a two-dimensional map to be scrolled in a horizontal direction according to player's operation, and conquers the game by attacking an enemy character, and so forth.

As described above, the three-dimensional game is disclosed in the first document, and the two-dimensional game is disclosed in the second document. It is a recognized that the two-dimensional game can be developed into the three-dimensional game. The respective games have a specific amusement values, and cannot be compared with each other. However, there is no game for pursuing a further enjoyment of the game by combining the respective properties.

Of course, it is easily conceivable that the respective games are simply combined, but data for the two-dimensional game and data for the three-dimensional game would be required, resulting in a large processing load and a large memory capacity.

Therefore, a feature of certain exemplary embodiments relates to providing a novel game apparatus and storage medium storing game program.

Another feature of certain exemplary embodiments relates to providing a game apparatus and a storage medium storing game program which can increase interest of the game by utilizing properties of a two-dimensional game and of a three-dimensional game.

Still another feature of certain exemplary embodiments relates to providing a game apparatus and a storage medium storing game program capable of playing a two-dimensional game by utilizing a three-dimensional game space.

Certain exemplary embodiments employ the following configuration in order to solve the above-described problems. It should be noted that reference numerals and supplement inside the parentheses show one example of a corresponding relationship with the embodiments described later for easy understanding of the present invention, and does not limit the present invention.

A game apparatus according to an exemplary embodiment has an operating means with which a player makes an operation input, a display means for displaying a game image, and a storage means for storing in advance data for generating at least a virtual three-dimensional space. The game apparatus includes an input detecting means, a player character controlling means, an object controlling means, a contact detection means, a viewpoint controlling means, and a viewpoint switching means. The input detecting means detects input data corresponding to an operation input from the operating means, and temporarily stores it in the storage means. The player character controlling means arranges a player character to be operated by the player in the virtual three-dimensional space by utilizing player character data stored in the storage means in response to first input data temporarily stored by the input detecting means. The object controlling means arranges an object not to be operated by the player in the virtual three-dimensional space by utilizing object data stored in the storage means. The contact detection means determines whether or not the player character and a predetermined object are contacted with each other. The viewpoint controlling means controls a viewpoint in the virtual three-dimensional space. The viewpoint switching means switches the viewpoint depending on second input data temporarily stored by the input detecting means. The contact detection means changes contact detection data set to the predetermined object depending on a switching result of the viewpoint switching means.

More specifically, a game apparatus (12) has an operating means (22, 26) with which a player makes an operation input, a display means (34) for displaying a game image, and a storage means (40) for storing in advance data for generating at least a virtual three-dimensional space. The game apparatus further includes an input detecting means (36, S51), a player character controlling means (36, S5), an object controlling means (36, S7), contact detection means (36, S9), a viewpoint controlling means (36, S3), and a viewpoint switching means (36, S21, S23, S29). The input detecting means detects input data corresponding to an operation input from the operating means, and temporarily stores it in the storage means. The player character controlling means arranges a player character to be operated by the player in the virtual three-dimensional space by utilizing player character data (404c) stored in the storage means in response to first input data temporarily stored by the input detecting means. For example, the player character is moved in response to an operation input from the operating means within the virtual three-dimensional space. The object controlling means arranges an object not to be operated by the player in the virtual three-dimensional space by utilizing object data (404d) stored in the storage means. For example, a computer or a processor (36) causes an enemy object to appear, move independent of player's operation according to a program, and arrange (generate) an item object and a background object (104,106,108). The contact detection means determines whether or not the player character and a predetermined object are contacted with each other. The viewpoint controlling means controls a viewpoint (virtual camera) in the virtual three-dimensional space. For example, a position of the viewpoint is updated according to the movement of the player character. The viewpoint switching means switches the viewpoint depending on second input data temporarily stored by the input detecting means. For example, according to an instruction of switching the viewpoint by the player, the position and the direction of the viewpoint are switched. The contact detection means changes contact detection data set to the predetermined object depending on a switching result of the viewpoint switching means.

According an exemplary embodiment, a contact detection is executed by utilizing contact detection data depending on the viewpoint, so that a player can enjoy playing a game by viewing a different game screen depending on the viewpoint.

In one exemplary embodiment, the contact detection data includes first detection data for performing a contact detection on all the coordinate systems defining a virtual three-dimensional space and second detection data for performing a contact detection on one or a combination of any two of the coordinates systems defining the virtual three-dimensional space, and the contact detection means selects any one of the first detection data and the second detection data depending on a switching result of the viewpoint switching means. More specifically, the contact detection data includes first detection data (404i) for performing a contact detection on all the coordinate systems defining a virtual three-dimensional space and second detection data (404j) for performing a contact detection on one or a combination of any two of the coordinates systems defining the virtual three-dimensional space. For example, the first detection data is data for performing a contact detection in an x-axis direction, a y-axis direction, and a z-axis direction within a virtual three-dimensional space. Furthermore, the second detection data is data for performing a contact detection within the virtual three-dimensional space in one or a combination of any two of the x-axis direction, the y-axis direction, and the z-axis direction (x-axis direction and y-axis direction, y-axis direction and z-axis direction, and z-axis direction and x-axis direction). The contact detection means selects any one of the first detection data and the second detection data depending on a switching result of the viewpoint switching means. A contact detection is performed on the three-dimensional display and the two (one) dimensional display, and therefore, it is possible to perform a contact detection in a first-dimensional or a second-dimensional manner in the three-dimensional game.

In one exemplary aspect of certain exemplary embodiment embodiments, the game apparatus further includes a mode switching means for switching between a first mode for switching a view point as to all the coordinates systems defining the virtual three-dimensional space by the viewpoint switching means and a second mode for switching a viewpoint by combining one or a combination of any two of the coordinates systems defining the virtual three-dimensional space by the viewpoint switching means. The contact detection means selects the first detection data when the mode switching means switches to the first mode, and the contact detection means selects the second detection data when the mode switching means switches to the second mode. More specifically, the game apparatus further includes a mode switching means (36, S55, S59, S61, S63). The mode switching means switches between a first mode for switching a view point as to all the coordinates systems defining the virtual three-dimensional space by the viewpoint switching means and a second mode for switching a viewpoint by combining one or a combination of any two of the coordinates systems defining the virtual three-dimensional space by the viewpoint switching means. Accordingly, in the first mode, a switching of the viewpoint is performed on all the x-axis direction, the y-axis direction, and the z-axis direction. On the other hand, in the second mode, a switching of the viewpoint is performed on one or a combination of any two of the x-axis direction, the y-axis direction, and the z-axis direction (x-axis direction and y-axis direction, y-axis direction and z-axis direction, and z-axis direction and x-axis direction). Thus, the contact detection means selects the first detection data when the mode switching means switches to the first mode, and the contact detection means selects the second detection data when the mode switching means switches to the second mode. The viewpoint can thus be switched, so that a player can enjoy playing a game while viewing a different game screen depending on the viewpoint. For example, it is possible to play a game by displaying the game screen of the three-dimensional game in a two-dimensional manner.

A storage medium storing game program according to an exemplary embodiment stores a game program of a game apparatus having an operating means with which a player makes an operation input, a display means for displaying a game image, and a storage means for storing in advance data for generating at least a virtual three-dimensional space. The game program makes a processor of the game apparatus function as an input detecting means, a player character controlling means, an object controlling means, a contact detection means, a viewpoint controlling means, and a viewpoint switching means. The input detecting means detects input data corresponding to an operation input from the operating means, and temporarily stores it in the storage means. The player character controlling means arranges a player character to be operated by the player in the virtual three-dimensional space by utilizing the player character data stored in the storage means in response to first input data temporarily stored in the input detecting means. The object controlling means arranges an object not to be operated by the player in the virtual three-dimensional space by utilizing the object data stored in the storage means. The contact detection means determines whether or not the player character and the predetermined object are contacted with each other. The viewpoint controlling means controls a viewpoint in the virtual three-dimensional space. The viewpoint switching means switches the viewpoint depending on second input data temporarily stored by the input detecting means. The contact detection means changes contact detection data set to the predetermined object depending on a switching result of said viewpoint switching means.

In an exemplary embodiment also, similarly to the above-described game apparatus, a player can enjoy playing a game by viewing different game screen depending on the viewpoint.

The above described features, aspects, and advantages of certain exemplary embodiments will become more apparent from the following detailed description when taken in conjunction with the accompanying drawings.

DETAILED DESCRIPTION

Figure 1:
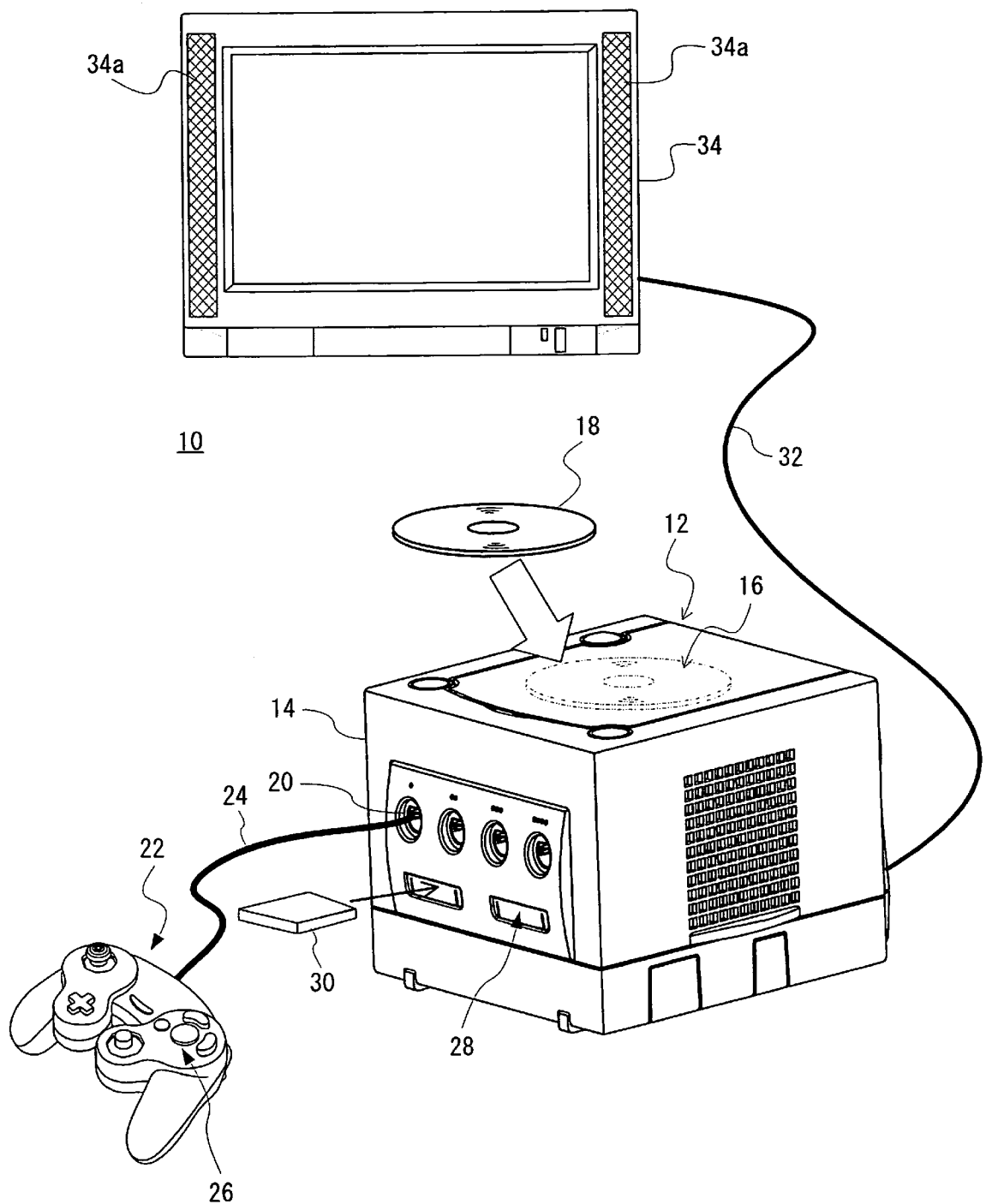
FIG. 1 is an illustrative view showing a game system of one exemplary embodiment.

Referring to FIG. 1, a video game system 10 of one exemplary embodiment includes a video game apparatus 12. The video game apparatus 12 includes an approximately cubic housing 14, and the housing 14 is provided with an optical disk drive 16 on an upper surface thereof. An optical disk 18 which is one example of an information storage medium storing a game program, and the like is mounted on the optical disk drive 16. The housing 14 is provided with a plurality of connectors 20 (four in this embodiment) on a front surface thereof. These connectors 20 are for connecting a controller 22 to the video game apparatus 12 by a cable 24, and can connect up to four controllers to the video game apparatus 12 in this exemplary embodiment.

The controller 22 is provided with an operating portion (operating switch) 26 on upper, lower, lateral sides and etc. thereof. The operating portion 26, for example, includes two analog joysticks, one cross switch, a plurality of button switches, and so on. One analog joystick is utilized for inputting a moving direction and/or a moving speed, moving amount, etc. of a player character (a moving image character object, operable with the controller 22 by a player) according to an amount and a direction of an inclination of the stick. The other analog joystick is utilized for controlling a movement of the virtual camera according to a direction of an inclination thereof. The cross switch is utilized for instructing a moving direction of the player character in place of the analog joystick. The button switches are utilized for instructing a movement of the player character, switching a point of view of the virtual camera in the three-dimensional image, adjusting the moving speed of the player character and etc. The button switches, for example, further control a menu selection and a movement of a pointer or a cursor.

It should be noted that the controller 22 is connected to the video game apparatus 12 by the cable 24 integrated into the controller 22 in this embodiment. However, the controller 22 may be connected to the video game apparatus 12 by another method such as a wireless manner via an electromagnetic wave (radio wave, infrared ray, for example). Furthermore, a detailed structure of the operating portion 26 of the controller 22 is, of course, not limited to the structure of the exemplary embodiment, and can be arbitrarily changed or modified. For example, only one analog joystick may be utilized, or no analog joysticks may be utilized. The cross switch may not be utilized.

At least one or a plurality of (two in this embodiment) memory slots 28 are provided below the connectors 20 on the front surface of the housing 14 of the video game apparatus 12. A memory card 30 is inserted to this memory slot 28. The memory card 30 is utilized for loading the game program, etc. read from the optical disk 18 so as to temporarily store it, or saving game data of the game (result data or progress data of the game) that the player plays by utilizing the game system 10.

The housing 14 of the video game apparatus 12 is provided with an AV cable connector (not shown) on its rear surface. The connector allows a monitor 34 to be connected to the video game apparatus 12 over an AV cable 32. The monitor 34 is typically a color television receiver, and the AV cable 32 inputs a video signal from the video game apparatus 12 to a video input terminal of the color television and inputs a sound signal to a sound input terminal. Accordingly, a game image of a three-dimension (3D) video game, for example, is displayed on the color television (monitor) 34, and a game sound (stereo game sound) such as a game music, a sound effect, etc. is output from right and left speakers 34a.

In the game system 10, a user or a game player first turns on an electric power source of the video game apparatus 12 in order to play a game (or another application), and then selects a suitable optical disk 18 storing a video game (or another application the play wants to play), and loads the optical disk 18 on the disk drive 16 of the video game apparatus 12. In response thereto, the video game apparatus 12 starts to execute the video game or another application on the basis of software stored in the optical disk 18. The player operates the controller 22 so as to apply an input to the video game apparatus 12. For example, the player starts the game or another application by operating any one of the operating portion 26. By moving another of the operating portion 26, it is possible to move the moving image object (player character) in different directions and to change a viewpoint of the user (camera position) in the three-dimensional (3D) game world.

Figure 2:
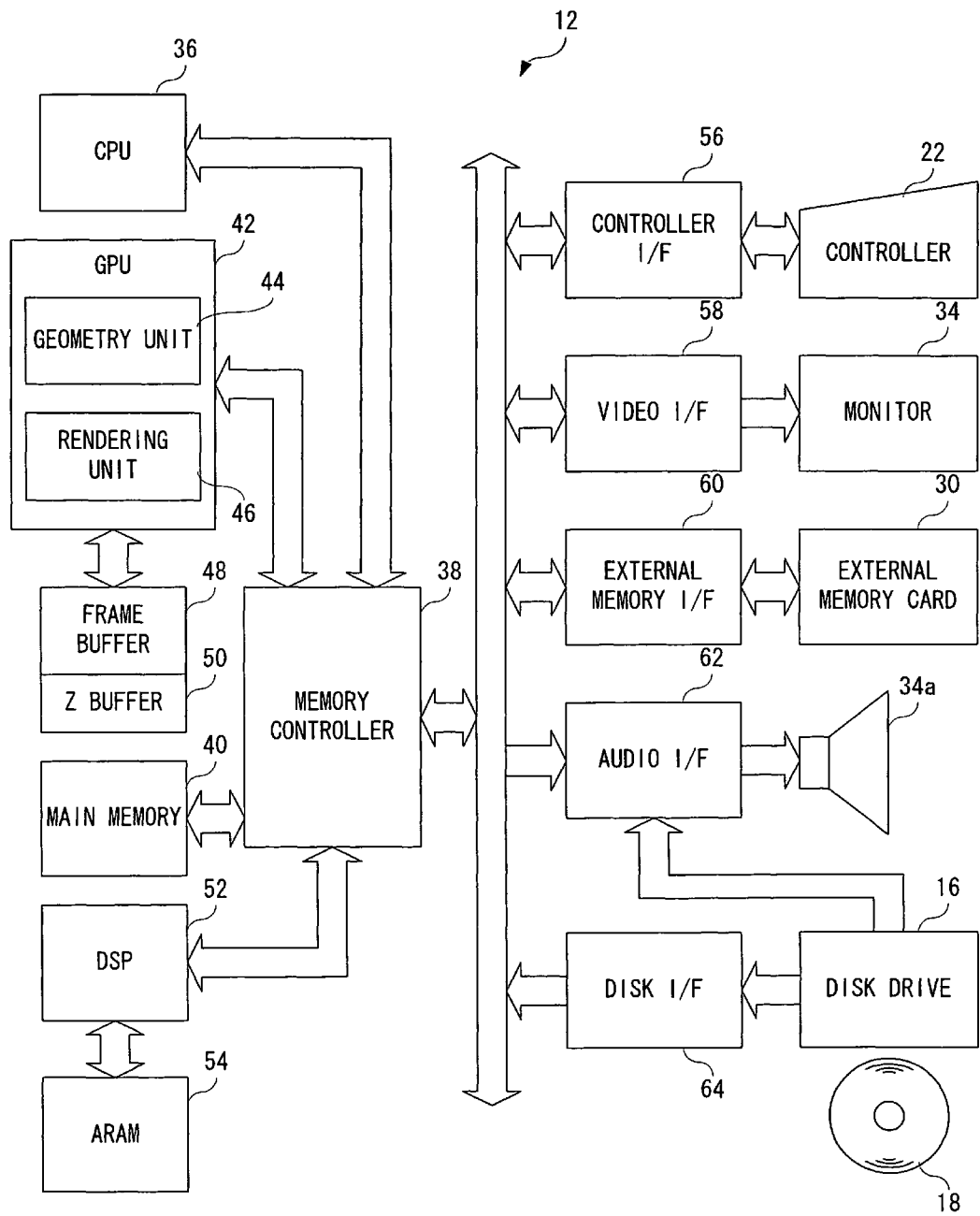
FIG. 2 is a block diagram showing an electric configuration of the game system shown in FIG. 1.

FIG. 2 is a block diagram showing an electric configuration of the video game system 10 of FIG. 1 embodiment. The video game apparatus 12 is provided with a central processing unit (hereinafter, may be referred to as "CPU") 36. The CPU 36 is called a computer or a processor, and is in charge of governing overall control of the video game apparatus 12. The CPU 36 or the computer functions as a game processor and is connected with a memory controller 38 via a bus. The memory controller 38 mainly controls writing to and reading from a main memory 40 connected via a bus under control of the CPU 36. The memory controller 38 is connected with a GPU (Graphics Processing Unit) 42.

The GPU 42 forms a part of a rendering means, and is constructed by a single chip ASIC, for example. The GPU 42 receives a graphics command from the CPU 36 via the memory controller 38, and, in response to the command, generates the three-dimensional (3D) game image by a geometry unit 44 and a rendering unit 46. Specifically, the geometry unit 44 performs a coordinate operation process such as turn-around or rotation, movement, transformation, etc. of a variety of objects and objects (which is formed by a plurality of polygons, and the polygon is a polygonal plane defined by at least three vertex coordinates) in a three-dimension coordinates system. The rendering unit 46 performs an image generating process such as pasting a texture on each of polygons of the variety of objects, and so on. Thus, three-dimension image data to be displayed on the game screen is created by the GPU 42, and the image data is stored in the frame buffer 48.

It should be noted that data (primitive or polygon, texture, etc.) required to execute the construction command is acquired by the GPU 42 from the main memory 40 via the memory controller 38.

The frame buffer 48 is a memory for rendering (storing) one frame of the image data of the raster scan monitor 34, for example, and is rewritten by the GPU 42 every one frame. More specifically, the frame buffer 48 stores color information of the image for each pixel in order. Here, the color information is data as to R, G, B, and A, and is, for example, R (red) data of 8 bits, G (green) data of 8 bits, B (blue) data of 8 bits, and A (alpha) data of 8 bits. It should be noted that the A data is data as a mask (mat image). A video I/F 58 described later reads the data stored in the frame buffer 48 via the memory controller 38 to display a 3D game image on the screen of the monitor 34.

Furthermore, a Z buffer 50 has a storage capacity equal to the number of pixels corresponding to the frame buffer 48×the number of bits of depth data per one pixel, and stores depth information or depth data (Z value) of dots corresponding to respective storing positions of the frame buffer 48.

It should be noted that the frame buffer 48 and the Z buffer 50 may be constructed by utilizing a portion of the main memory 40, or may be provided inside the GPU 42.

The memory controller 38 is also connected to an RAM for audio 54 (hereinafter, to be referred as "ARAM") via a DSP (Digital Signal Processor) 52. Accordingly, the memory controller 38 controls the writing to and/or reading from the ARAM 54 as a sub memory in addition to the main memory 40.

The DSP 52 functions as a sound processor, and generates audio data corresponding to a sound required for the game, a sound or music by use of the sound data (not shown) stored in the main memory 40 or by use of sound wave form data written to the ARAM 54.

The memory controller 38 is further connected to respective interfaces (I/F) 56, 58, 60, 62, and 64 by buses. The controller I/F 56 is an interface for the controller 22 to be connected to the video game apparatus 12, and applies an operation signal or operation data of the operating portion 26 of the controller 22 to the CPU 36 through the memory controller 38. The video I/F 58 accesses the frame buffer 48 to read the image data formed by the GPU 42 and then, applies the image signal or the image data (digital RGB pixel values) to the monitor 34 via the AV cable 32 (FIG. 1).

The external memory I/F 60 makes the memory card 30 (FIG. 1) which is inserted to the front surface of the video game apparatus 12 communicate to the memory controller 38. This allows the CPU 36 to write and read the data to and from the memory card 30 (FIG. 1) via the memory controller 38. The audio I/F 62 receives audio data applied from the DSP 52 through the memory controller 38 or an audio stream read from the optical disk 18, and then applies an audio signal (sound signal) corresponding thereto to the speakers 34a of the monitor 34.

The disk I/F 64 connects the disk drive 16 to the memory controller 38, and whereby the CPU 36 controls the disk drive 16. By the disk drive 16, a program, data, texture data, etc. read from the optical disk 18 are written to the main memory 40 under control of the CPU 36.

Figure 3:
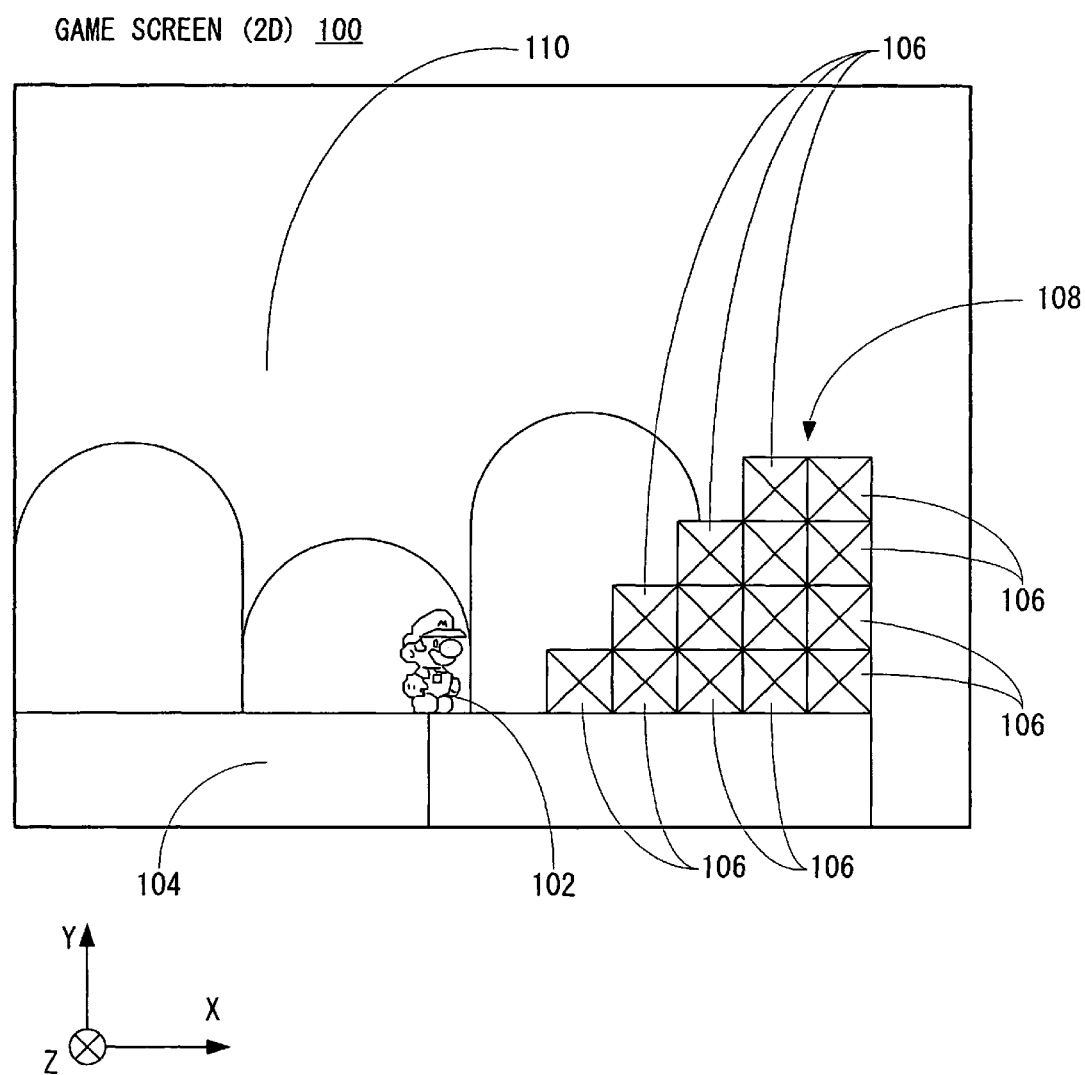
FIG. 3 is an illustrative view showing one example of a 2D game screen displayed on a monitor shown in FIG. 1.

FIG. 3 shows one example of a game screen 100 of a virtual game (action game) in this exemplary embodiment. The game screen 100 displays a player character 102, a ground object (floor object) 104, a step object 108 including a plurality of block objects 106, and a background image 110. As understood from FIG. 3, the game screen 100 is displayed in a two dimensional (2D) manner such that the player character 102 is viewed from a side vertical to a direction of movement (x-axis direction). Although illustration is omitted, the 2D game screen 100 is scrolled right to left, and up and down in accordance with the movement of the player character 102. Also, the game screen 100 may be scrolled in a combined direction, such as the upper left, the lower left, the upper right, and the lower right.

It should be noted that strictly speaking, in the image processing of the game apparatus 12, the player character 102 and the object (104, 106, 108, etc.) are subjected to a modeling process in the three dimension (3D). Accordingly, in a case that the game screen 100 shown in FIG. 3 is displayed, the position (three-dimensional position) and the direction of a virtual camera (viewpoint) not shown is set such that the game screen 100 looks like a pseudo-two dimensional display. The direction (viewpoint direction) of the viewpoint can be represented by an angle formed with a reference direction (home position direction where a virtual camera is not panned and tilted) set in advance. Or, the viewpoint direction may be represented by position coordinates of the center of interest defined by a distance and an angle with respect to the viewpoint.

It should be noted that, in this exemplary embodiment, the background image 110 is generated by pasting a texture on a billboard placed in a position indicated by a predetermined Z value in a 3-dimensional coordinates system, for example, a position corresponding to a far clipping plane in a case of displaying a 2D game screen 100.

Also, in this exemplary embodiment, in order to distinguish the player character to be operated by the player 102 from the object not to be operated by the player (104, 106, 108, etc.), a "character" and an "object" are separately utilized, but it is not necessary to strictly distinguish the "character" from the "object", and the same is merely a difference in terminology.

Figure 4:
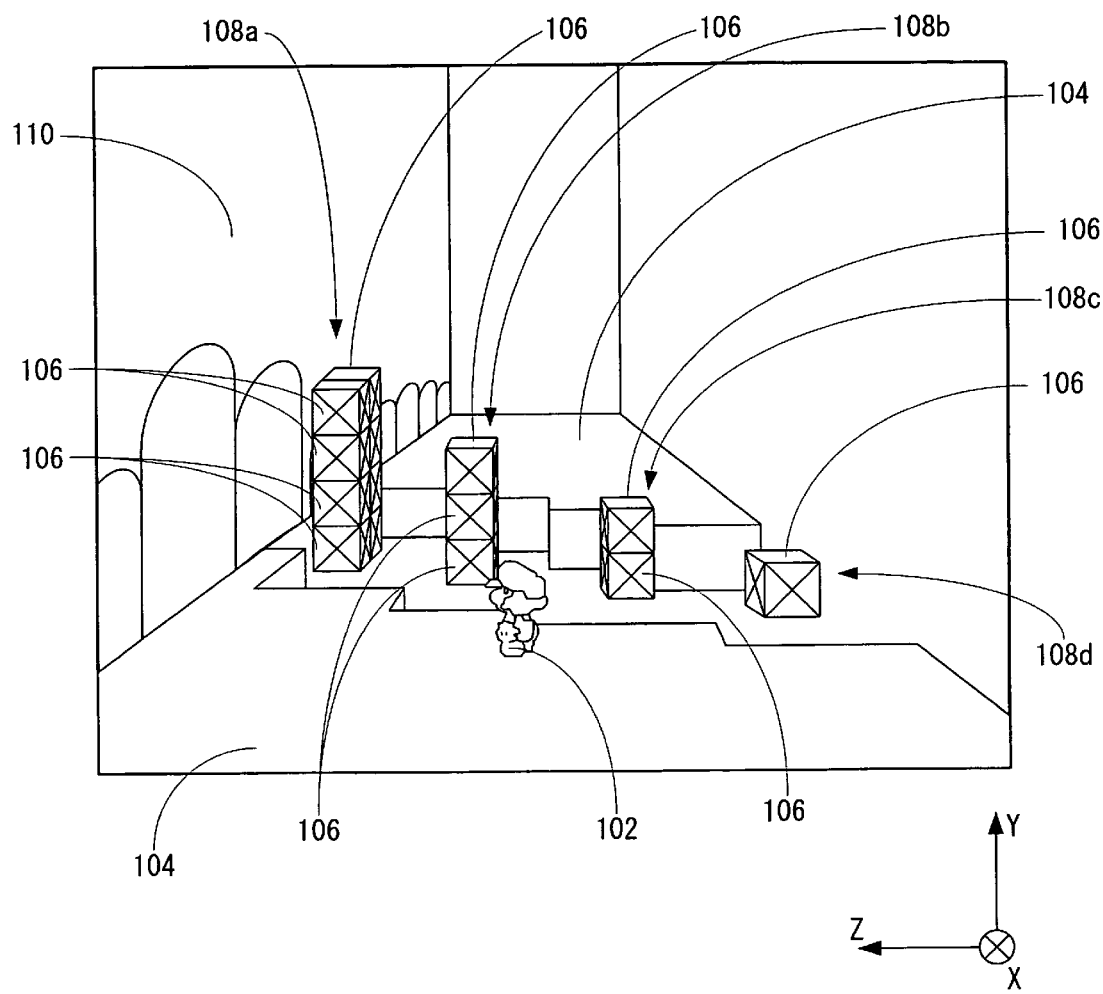
FIG. 4 is an illustrative view showing one example of a 3D game screen displayed on the monitor shown in FIG. 1.

FIG. 4 shows a 3D game screen 200 representing a scene, which is the same as the scene (position on the map) in FIG. 3. In the game screen 200 shown in FIG. 4, a viewpoint is moved to a different position from that when the game screen 100 is generated, and its direction is also changed. More specifically, the position of the viewpoint is switched to be at the back of the player character 102, and the direction of the viewpoint is switched so as to be directed to the direction of movement (x-axis direction). As can be understood from FIG. 4, on the game screen 200, the player character 102, the ground object 104, and the step object 108 are displayed in a 3D manner. The step object 108 includes four components 108a, 108b, 108c, and 108d, and each of the components 108a-108d is placed in a position different in a z-axis direction as well as in an x-axis direction. Also, each of the components 108a-108d includes one or more block objects 106. Accordingly, the position (height) in the y-axis direction of each of the components 108a-108d is different depending on the number of the accumulated blocks.

It should be noted that the background image 110 in the 2D game screen 100 is equal to a left side surface in a case the player character 102 is oriented to the direction of movement (x-axis direction) in the 3D game screen 200. Also, in the 3D game screen 200, the right side surface when the player character 102 is oriented to the direction of movement is not displayed. However, in reality, a transparent polygon (not illustrated) for detecting a contact is arranged on the right side surface to prevent the player character 102 from moving in a right direction (z-axis direction) with respect to the direction of movement.

It should be noted that the right side surface when the 3D game screen 200 is displayed is equal to the near clipping plane when the 2D game screen 100 is displayed.

Thus, even on the same scene, the 2D game screen 100 can be displayed to advance the game while the 3D game screen 200 also can be displayed to advance the game. For example, the player can switch the virtual camera (viewpoint) by operating any of the operating portions 26 of the controller 22. Thus, the player advances the game by selectively displaying the 2D game screen 100 and the 3D game screen 200 to conquer the game (map).

As understood from the 3D game screen 200 shown in FIG. 4, for example, in the scene shown in FIG. 3 and FIG. 4, the player makes the player character 102 advance in the direction of movement (x-axis direction) across a portion where the ground object 104 and the step object 108 are absent (do not exist). That is, in the virtual three-dimensional space, the step object 108 is separated into the components 108*a*-108*d*, and no ground object 104 is placed between each of the components 108*a*-108*d*, and therefore, the player character 102 is apt to fall (downwardly move in the y-axis direction). On the other hand, in the 2D game screen 100 shown in FIG. 3, the step object 108 is integrally displayed like a step, and therefore, if the player character 102 moves on the step object 108, it never falls. That is, in such a scene, the player character 102 can be moved more easily when being displayed in the 2D game screen 100 than when being displayed in the 3D game screen 200.

It should be noted that as described above, the player character 102, etc., is subjected to a modeling in the three-dimensional manner, and even if the 2D game screen 100 is displayed, the player character 102 moves in the 3D virtual space. Thus, without any treatment, if the player character 102 moves in the direction of movement (x-axis direction) through the space between the component 108*a* and the component 108*b* in the z-axis direction of the virtual tree-dimensional space, the player character 102 causes the inconvenience of falling through the block object 106 on the 2D game screen 100 even though it moves on the step object 108. By contrast, in a case that the 3D game screen 200 is displayed, the player character 102 has to fall at a position of no ground object 104 between the component 108*a* and component 108*b*.

In order to avoid these problems, collision data (2D collision data 404*h*) for displaying a predetermined object (step object 108 in this embodiment) in the 2D game screen 100 and the collision data (3D collision data 404*i*) for displaying it in the 3D game screen 200 are prepared so as to be selectively utilized.

Figure 5:
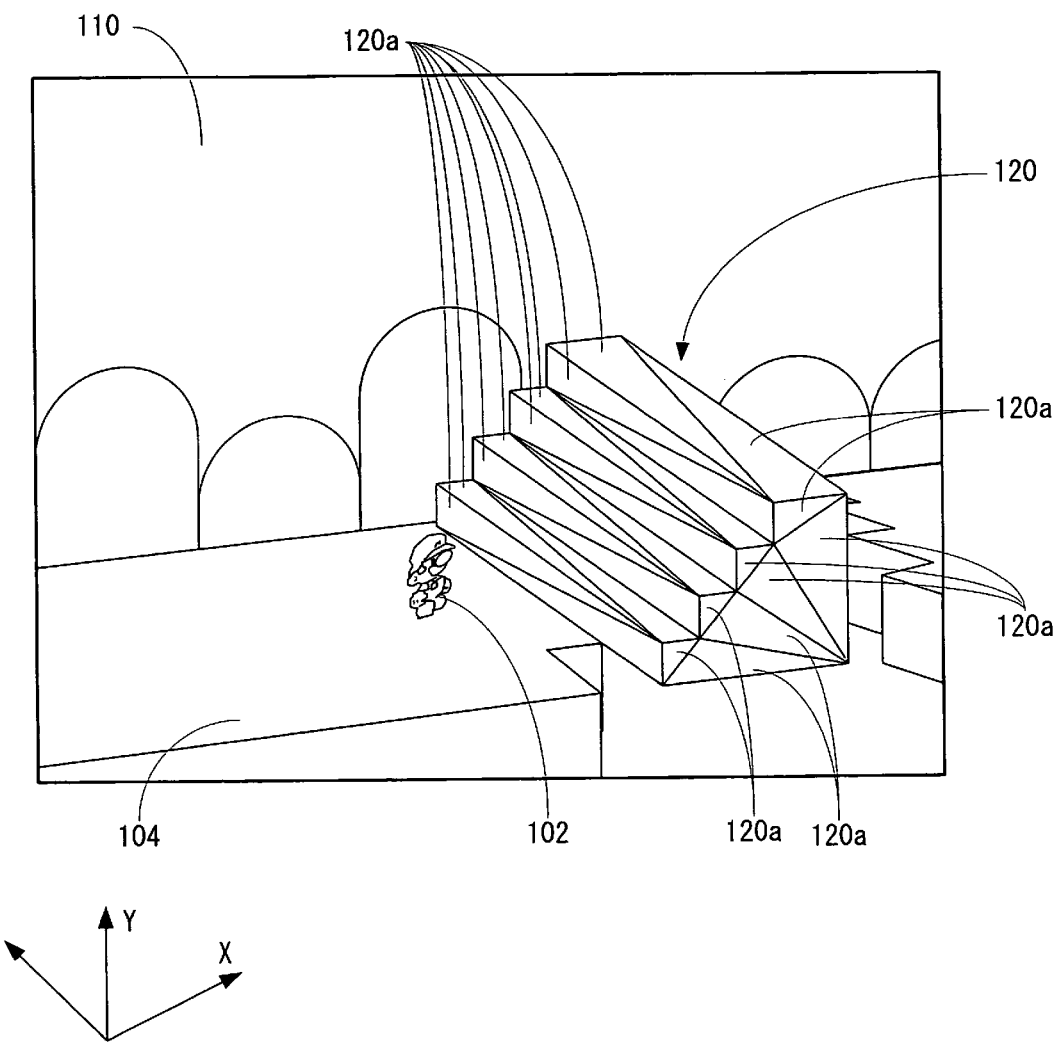
FIG. 5 is an illustrative view showing one example of a polyhedron for detecting contact set to a step object in a case that the 2D game screen shown in FIG. 3 is being displayed.

More specifically, in a case that the 2D game screen 100 shown in FIG. 3 is displayed, a polyhedron for detecting contact 120 shown in FIG. 5 is arranged to the step object 108. The polyhedron 120 includes a plurality of transparent polygons 120*a*, and is invisible in a case that the game screen 100 is actually displayed. In addition, as understood from FIG. 5, the polyhedron 120 is formed by a plurality of polygons 120*a* in a horizontally-long step shape. The width of the polyhedron 120 is sectioned by the near clipping plane and the far clipping plane in the z-axis direction. Thus, in a case that the player character 102 moves on the step object 108, the player character 102 is displayed so as to contact the polyhedron 120 wherever it is in the z-axis direction, and so as not to fall from the step object 108. It should be noted that in FIG. 5 (the same is true for FIG. 6), for understanding the polyhedron for detecting contact 120, the outline of the polygons 120*a* is represented.

Figure 6:
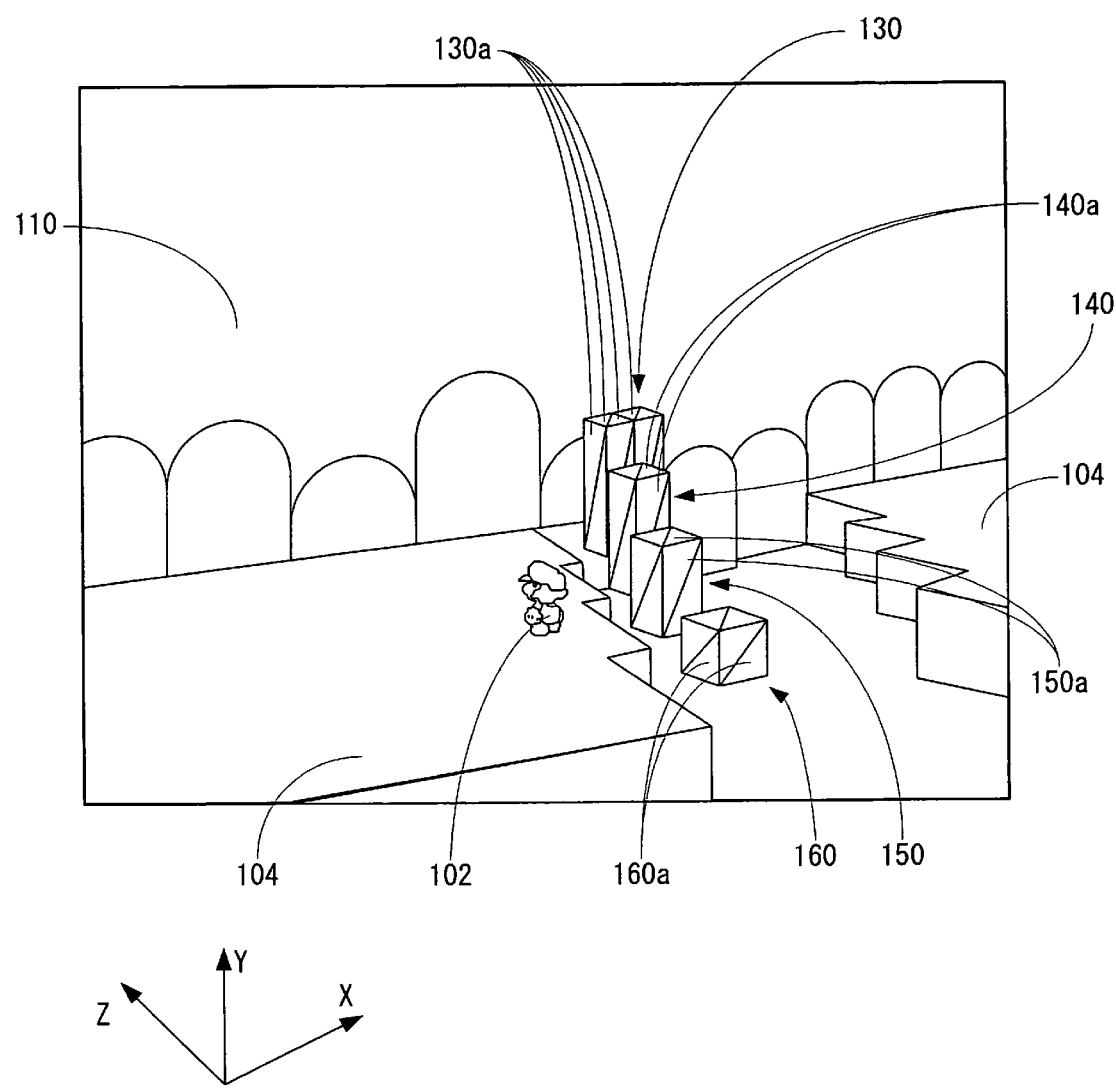
FIG. 6 is an illustrative view showing one example of a polyhedron for detecting contact set to the step object when the 3D game screen shown in FIG. 4 is displayed.

On the other hand, as to the step object 108 of the 3D game screen 200 shown in FIG. 4, the Z value is different in each of the components 108*a*-108*d*. Accordingly, as shown in FIG. 6, polyhedrons for detecting contact 130, 140, 150, and 160 are respectively arranged for the components 108*a*-108*d*. More specifically, the polyhedron 130 is set with respect to the component 108*a*, the polyhedron 140 is set with respect to the component 108*b*, the polyhedron 150 is set with respect to the component 108*c*, and the polyhedron 160 is set with respect to the component 108*d*. Furthermore, the polyhedron 130 includes a plurality of polygons 130*a*, the polyhedron 140 includes a plurality of polygons 140*a*, the polyhedron 150 includes a plurality of polygons 150*a*, and the polyhedron 160 includes a plurality of polygons 160*a*.

Accordingly, in a case that the player wants the player character 102 to move to a place where no components 108*a*-108*d* are arranged by operating the controller 22, the player character 102 needs to jump toward the ground object 104 of the opposite shore. This is because if the player character does not reach the ground object 104 of the opposite shore, the player object displays such that it falls down and then dies out. That is in such a case, the player character 102 does not contact the polyhedron 130-160, so that it does not ride on any of the components 108*a*-108*d*.

It should be noted that for better understanding of the polyhedrons for detecting contact 120-160, FIG. 5 and FIG. 6 show a state when a virtual three-dimensional space (game) is obliquely viewed by placing a virtual camera (viewpoint) in a position different from that in the game screen 100 shown in FIG. 3 and the game screen 200 shown in FIG. 4.

Figure 7:
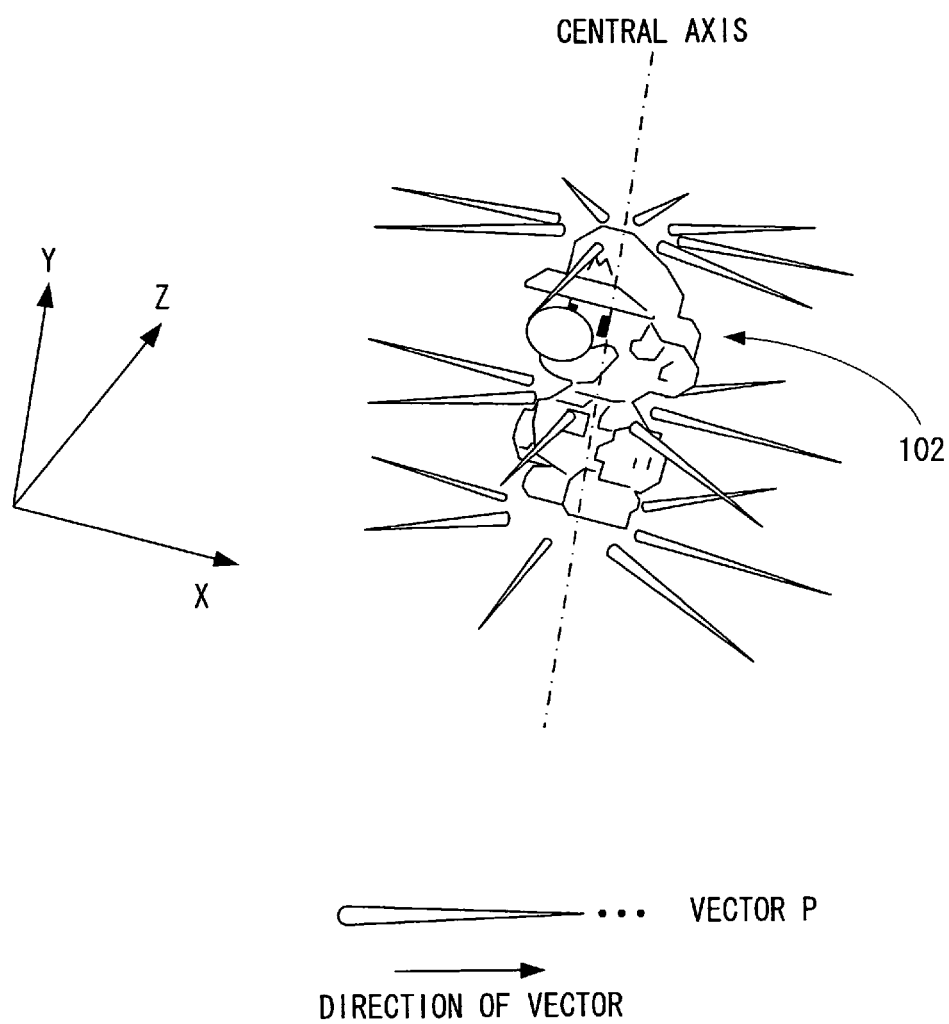
FIG. 7 is an illustrative view showing a vector for contact detection which is set to a player character.

Next, a description is made on the contact detection. First, a description is made on a method of detection whether the player character 102 and the object to which collision data in advance is prepared are contacted with each other. In such a case, a plurality of vectors for performing a contact detection is set to the player character 102. As shown in FIG. 7, a plurality of vectors P from the central axis (axis in parallel with the Y axis) of the player character 102 to the outside are set to the player character 102.

It should be noted that in FIG. 7, for the sake of simplicity, the vector P is represented by wedges. Also, for the sake of simplicity, in FIG. 7, the wedges are represented so as to protrude from the surface of the player character 102, but the start point of each vector P is actually on the central axis. Also, although it is difficult to understand it in FIG. 7, each of the vectors P (scalar) is the same in size.

Furthermore, in such a case, the collision data to be used is different depending on the fact that the game screen currently being displayed is a 2D display or a 3D display. That is, if the 2D game screen 100 is displayed, the collision data for 2D (404*h* shown in FIG. 9) is utilized, and if the 3D game screen 200 is displayed, the collision data for 3D (404*i* shown in FIG. 9) is utilized.

Also, as described by use of FIG. 5 and FIG. 6, a polyhedron (polyhedron 120, polyhedrons 130-160, for example) including a plurality of transparent polygons are set to the predetermined object (step object 108, for example) according to the prepared collision data. Thus, if a contact detection is performed by utilizing the collision data prepared in advance, it is determined that each of the polygons (120*a*-160*a*) included in the polyhedron (120-160) set in accordance with the collision data and the vector P are contacted with each other. More specifically, the presence or absence of the contact is determined depending on whether or not the vector P and the polygonal plane cross each other, or whether or not the vector P is included in the polygonal plane.

It should be noted that if the contact detection is performed by use of the 3D collision data, detection is made on all the vectors P set to the player character 102. That is, a contact detection is performed in the x-axis direction, the y-axis direction, and the z-axis direction on the virtual three-dimensional space. On the other hand, if the contact detection is made by use of the 2D collision data, only a direction in parallel with the X axis out of the vectors P set to the player characters 102 is utilized. That is, a contact detection as to the z-axis direction is not performed, and the contact detection as to only the x-axis direction and the y-axis direction are executed. That is, the z-axis direction is neglected.

Next, a description is made on the contact detection between the player character 102 and the enemy object (not illustrated), the contact detection between the enemy objects, or the contact detection between the player character 102 and the item object (not illustrated), and so forth. In such a case, as to the enemy object and the item object, the contact detection data (collision data) needs not to be prepared, and cannot be prepared. This is because that the enemy object moves around the virtual three-dimensional space, and the item object may not appear. Thus, in such a case, collision data (simple data as to a plane figure or a solid figure in this exemplary embodiment) of the enemy object and the item object are created (calculated) every time that the contact detection is required. Also, in such a case, in order to simply perform the contact detection, the collision data is also created as to the player character 102 similarly to other objects.

More specifically, as to the contact detection, for display of the 2D game screen 100, the player character 102, the enemy object, and the item object are displayed in the form of a plane figure (plane figure in parallel with X and Y planes in this exemplary embodiment), such as a circle, a rectangle (oblong and square) such that the outlines thereof are enclosed. That is, the height (length in the Y-axis direction) and the width (length in the X-axis direction) of the player character 102, the enemy object, and the item object are obtained, and the plane figure is calculated on the basis of the height and the width in the X and Y axes (X and Y planes).

On the other hand, for display of the 3D game screen 200, the player character 102, the enemy object, and the item object are displayed in the form of solid figure, such as a round, a column, a cube, a rectangular parallelepiped, or the like such that the outlines thereof are enclosed. That is, the height (length in the Y-axis direction), the width (height in the X-axis direction), and the depth (length in the Z-axis direction) of the player character 102, the enemy object, and the item object are obtained, and the solid figure in the X, Y, and Z axes (virtual three-dimensional space) is calculated on the basis of the height, the width, and the depth.

It should be noted that in a case that the contact detection between the player character 102 and the enemy object, the contact detection between the enemy objects, the contact detection between the player character 102 and the item object, etc. are performed, ones on which the contact detection is performed are represented in the same figures. Although the contact detection between the objects is described in detail below, this same is true for the contact detection between the player character 102 and the enemy object, and the contact detection between the player character 102 and the item object.

Figure 8:
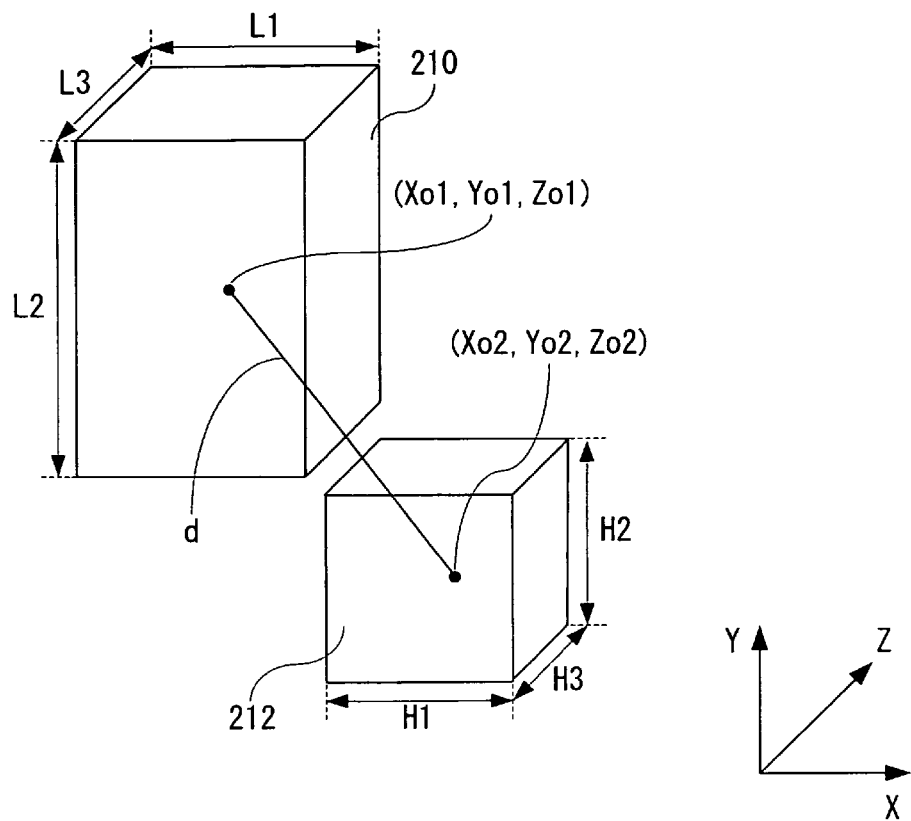
FIG. 8 is an illustrative view for explaining a contact detection performed between objects.
Figure 8:
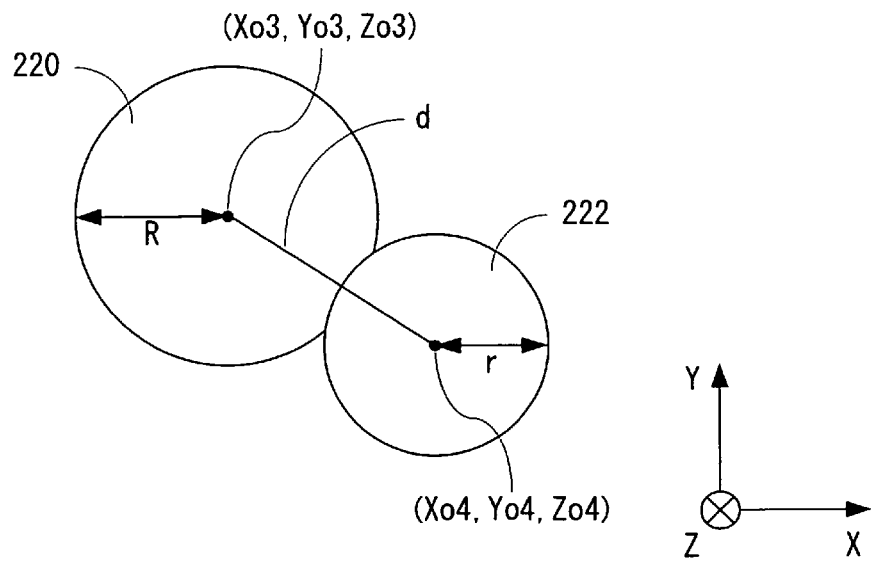

Referring to FIG. 8 (A), a contact detection is described when the figure corresponding to the collision data of the object (210 and 212, here) is set (calculated) to a quadrangular prism shape, such as a rectangular parallelepiped or a cube. As understood from FIG. 8 (A), the object 210 has the position coordinates (central coordinates) of (Xo1, Yo1, Zo1), and the length in the X-axis direction (in the horizontal direction), the length in the Y-axis direction (in the vertical direction), and the length in the Z-axis direction (in the depth direction) are L1, L2, and L3, respectively. On the other hand, the object 212 has the position coordinates (central coordinates) of (Xo2, Yo2, Zo2), and the length in the X-axis direction (in the horizontal direction), the length in the Y-axis direction (in the vertical direction), and the length in the Z-axis direction (in the depth direction) are H1, H2, and H3, respectively. Thus, in a case that the outline of each of the objects is set to the quadrangular prism shape, if the distance (distance between centers) d of the objects and the length of each side satisfies all the following equations 1-3, it is determined that the object 210 and the object 212 are contacted with each other. However, if any one of the equations 1-3 is not satisfied, it is determined that the object 210 and the object 212 are not contacted. It should be noted that in the equations 1-3, the dx, the dy, and the dz are respectively the X component, the Y component, and the Z component of the distance between centers d. Furthermore, each of the components dx, dy, and dz of the distance between centers d is calculated according to the equation 4.

$$|L1-H1| \leq dx \qquad \text{[Equation 1]}$$

$$|L2-H2| \leq dy \qquad \text{[Equation 2]}$$

$$|L3-H3| \leq dz \qquad \text{[Equation 3]}$$

$$dx = \sqrt{\{(Xo1-Xo2)^2\}}$$

$$dy = \sqrt{\{(Yo1-Yo2)^2\}}$$

$$dz = \sqrt{\{(Zo1-Zo2)^2\}} \qquad \text{[Equation 4]}$$

It should be noted that |•| is an absolute value. Although illustration is omitted, in a case that the 2D game screen 100 is displayed, the detection is simply made on the 2D direction, and therefore, the outline of the object is set to a rectangle (quadrilateral) shape such as, an oblong, a square, etc. Thus, when performing the contact detection, the Z component is neglected.

Also, referring to FIG. 8 (B), a description is made on a contact detection in case that the figure corresponding to the collision data of the object (220, 222, here) is set (calculated as) to a round shape (shown in a two dimensional circle in the drawing for simplicity). As understood from FIG. 8 (B), the object 220 is the position coordinates (central coordinates) (Xo3, Yo3, Zo3), and has a radius R. On the other hand, the object 222 is the position coordinates (central coordinates) (Xo4, Yo4, Zo4), and has a radius r. Thus, in a case that the outline of the object is set to a round shape, if the equations 5-7 shown below are satisfied, it is determined that the object 220 and the object 222 are contacted with each other. However, if any one of the equations 5-7 is not satisfied, it is determined that the object 220 and the object 222 are not contacted with each other. It should be noted that the distance from centers d (dx, dy, dz) is obtained according to the equation 4.

$$dx \leq R+r \qquad \text{[Equation 5]}$$

$$dy \leq R+r \qquad \text{[Equation 6]}$$

$$dz \leq R+r \qquad \text{[Equation 7]}$$

It should be noted that although illustration is omitted, if the 2D game screen 100 is displayed, the detection is simply made on the 2D direction, the outline of the object is set to circle. Thus, the contact detection as to the Z component is neglected.

Figure 9:
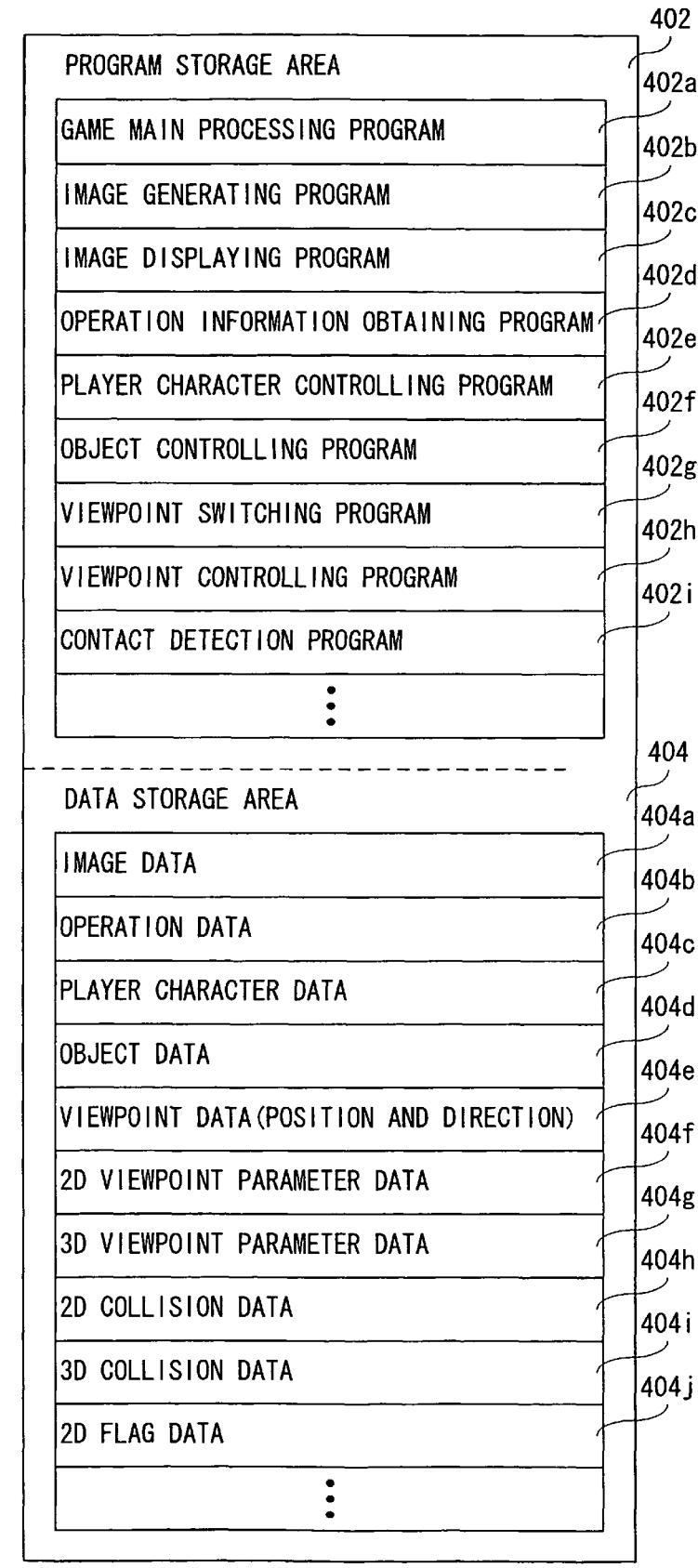
FIG. 9 is an illustrative view showing a memory map of a main memory.

FIG. 9 shows a memory map of the main memory 40. The main memory 40 includes a program storage area 402 and a data storage area 404. In the program storage area 402, a game program of the action game in this embodiment is stored. The game program includes a game main processing program 402a, an image generating program 402b, an image displaying program 402c, an operation information obtaining program 402d, a player character controlling program 402e, an object controlling program 402f, a viewpoint switching program 402g, a viewpoint controlling program 402h, a contact detection program 402i, etc.

The game main processing program 402a is a program for processing a main routine of the action game. The image generating program 402b is a program for generating a game image including a player character 102, a non-player object such as an enemy object, an item object, a background object (104,106,108), etc. existing in a virtual game space (virtual three-dimensional space).

Here, the player character 102 means a moving character moving around, and so forth in the virtual three-dimensional space according to an operation by the player. Also, the non-player object is an object moving according to the program independent of player's operation. The background object is an object as to a background, such as a wall, a floor (ground), a pillar, a tree, etc. These background objects are arranged to form a map of the action game.

The image displaying program 402c is a program for displaying on the monitor 34 a game image generated according to execution of the image generating program 402b. The operation information obtaining program 402d is a program for obtaining operation information (operation input) by the player, and detects operation data (operation signal) input from the controller 22 via the controller I/F 56 to store it in the data storage area 404.

The player character controlling program 402e is a program for calculating position coordinates (three-dimensional coordinates) of the moved player character 102 corresponding to the operation data obtained according to the operation information obtaining program 402d to update a current position, and making the player character 102 perform an arbitrary action, and so forth. Also, the player character controlling program 402e executes a process of reducing the life of the player character 102 according to a detection result of the contact detection program 402h described later, annihilating the player character 102 and the enemy object, making the player character 102 obtain an item, destroying a block object 106, and so forth.

The object controlling program 402f is a program for moving a non-player object such as an enemy object in the virtual three-dimensional space. Also, the object controlling program 402f is a program for decreasing the life of the player character 102 depending on a detection result of the contact detection program 402h, annihilates the player character 102 and the enemy object, making the player character 102 obtain an item, destroying the block object 106, and so forth.

The viewpoint switching program 402g is a program for switching the virtual camera (viewpoint) arranged in the virtual three-dimensional space. In this exemplary embodiment, the viewpoint switching program 402g is a program for switching between the virtual camera (viewpoint) position and the direction of the viewpoint for generating the 2D game screen 100, and the viewpoint position and the direction of the viewpoint for generating the 3D game screen 200. It should be noted that the viewpoint switching program 402g obtains viewpoint data (data of the position of the viewpoint and the direction of the viewpoint) to be stored in correspondence to the current position of the player character 102 from the viewpoint parameter for 2D (2D viewpoint parameter 404f) or the viewpoint parameter for 3D (3D viewpoint parameter 404g).

The viewpoint controlling program 402h is a program for controlling the movement of the virtual camera (viewpoint), that is, the change of the position of the viewpoint, and the change of the direction of the viewpoint. More specifically, the viewpoint controlling program 402h updates the X coordinate and the Y coordinate according to the operation input from the controller 22, that is, according to the movement of the player character 102 in a case that the 2D game screen 100 is displayed. It should be noted that in a case that the 2D game screen 100 is displayed, the Z coordinate of the viewpoint position is not changed until the operation input from the player. The viewpoint controlling program 402h updates each of the X coordinate, Y coordinate, and Z coordinate as if it follows the player character 102 in accordance with its movement in a case that the 3D game screen 200 is displayed.

It should be noted that although a detailed description is omitted, for either case of 2D or 3D, the player can change the position of the virtual camera (viewpoint) and the direction of the viewpoint (position of the center of the interest) by utilizing the controller 22. The change is stored (set) in the data storage area of the main memory 40. Therefore, when the position of the viewpoint and the direction of the viewpoint are changed, the position of the viewpoint is updated according to the movement of the player character 102 such that a positional relationship between the changed viewpoint position and the player character 102 is maintained, and the changed viewpoint direction is maintained.

The contact detection program 402i is a program for detecting that the player character 102 and other objects (104, 106, 108, etc.) are contacted (hit, collided) with each other, and is a program for detecting that the enemy objects are contacted with each other.

It should be noted that although illustration is omitted, in the program storage area 402, miscellaneous programs, such as a game sound reproducing program, a backup program, etc. are stored. The game sound reproducing program is a program for generating a sound necessary for the game, such as voices or an onomatopoeic sound of the character (object) appearing in the game, game music like a BGM, a sound effect, etc. Also, the backup program is a program for storing in the memory card 30 game data (proceeding data or result data of the game) stored (or temporarily stored) in the main memory 40 according to a predetermined event and player's instruction.

Furthermore, in the data storage area 404, image data 404a, operation data 404b, player character data 404c, object data 404d, viewpoint data 404e, 2D viewpoint parameter data 404f, 3D viewpoint parameter data 404g, 2D collision data 404h, 3D collision data 404i, 2D flag data 404j, etc.

The image data 404a is data (polygon data and texture data) for rendering characters and objects, such as a player character 102, an enemy object, an item object, a background object (ground object 104, block object 106, step object 108, etc.), and for rendering the background image 110. The operation data 404b is operation data input from the controller 22 according to the player operating the operating means of the controller 22. The character data 404c is data (coordinates data) as to the current three-dimensional position (three-dimensional coordinates) of the player character 102 in the virtual three-dimensional space. The character data 404c is updated according to player's operation input.

Furthermore, the object data 404*d* is coordinates data as to the current three-dimensional position (three-dimensional coordinates) of the object, such as an enemy object, an item object, and a background object (104, 106, 108) in the three dimensional space. It should be noted that the coordinates data is stored in correspondence to each of the objects, and the coordinates data of the moving image object such as the enemy object is updated according to the program (according to the process by the CPU 36).

The viewpoint data 404*e* is data (coordinates data) of the current three-dimensional position (three-dimensional coordinates) and data of the direction of viewpoint (angular data from a reference direction or coordinates data of the center of interest) of the virtual camera (viewpoint) in the virtual three-dimensional space. The 2D viewpoint parameter data 404*f* is viewpoint data to be referred when the 2D game screen 100 is displayed, and is set in advance in correspondence with each of the scenes or the position of the map. The 3D viewpoint parameter data 404*g* is viewpoint data to be referred when the 3D game screen 200 is displayed, and set in advance in correspondence with each of the scenes or the position of the map.

The 2D collision data 404*h* is contact detection data prepared for a predetermined object (step object 108 in this exemplary embodiment) when the 2D game screen 100 is displayed. More specifically, it is coordinates (three-dimensional coordinates) data as to vertices of the each of the polygons (120*a* in this exemplary embodiment) comprising a polyhedron (120 in this embodiment). For example, the 2D collision data 404*h* (the same is true for 3D collision data 404*i*) is table data in which a plurality of polygons are set corresponding to the predetermined object, and coordinates of the vertices of the polygon (three-dimensional coordinates) corresponding to each polygon is described.

The 3D collision data 404*i* is contact detection data prepared for a predetermined object (step object 108 in this embodiment) when the 3D game screen 200 is displayed. More specifically, it is three-dimensional coordinates data as to the vertices of each of the polygons (130*a*, 140*a*, 150*a*, 160*a* in this embodiment) comprising a polyhedron (130, 140, 150, 160 in this embodiment).

The 2D flag data 404*j* is flag data to determine whether or not the 2D game screen 100 is displayed. The 2D flag data 404*j* comprises 1 bit register, for example. If the flag is turned on (established), a data value "1" is set to the register, and if the flag is turned off (not established), a data value "0" is set to the register. It should be noted that if the 2D game screen 100 is displayed, the flag is turned on, and if the 3D game screen 200 is displayed, the flag is turned off.

It should be noted that although illustration is omitted, in the data storage area 404, game data generated according to the progress of the game or another flag data, etc. are stored. Also, sound (music) data for outputting a sound necessary for the game is also stored.

Figure 10:
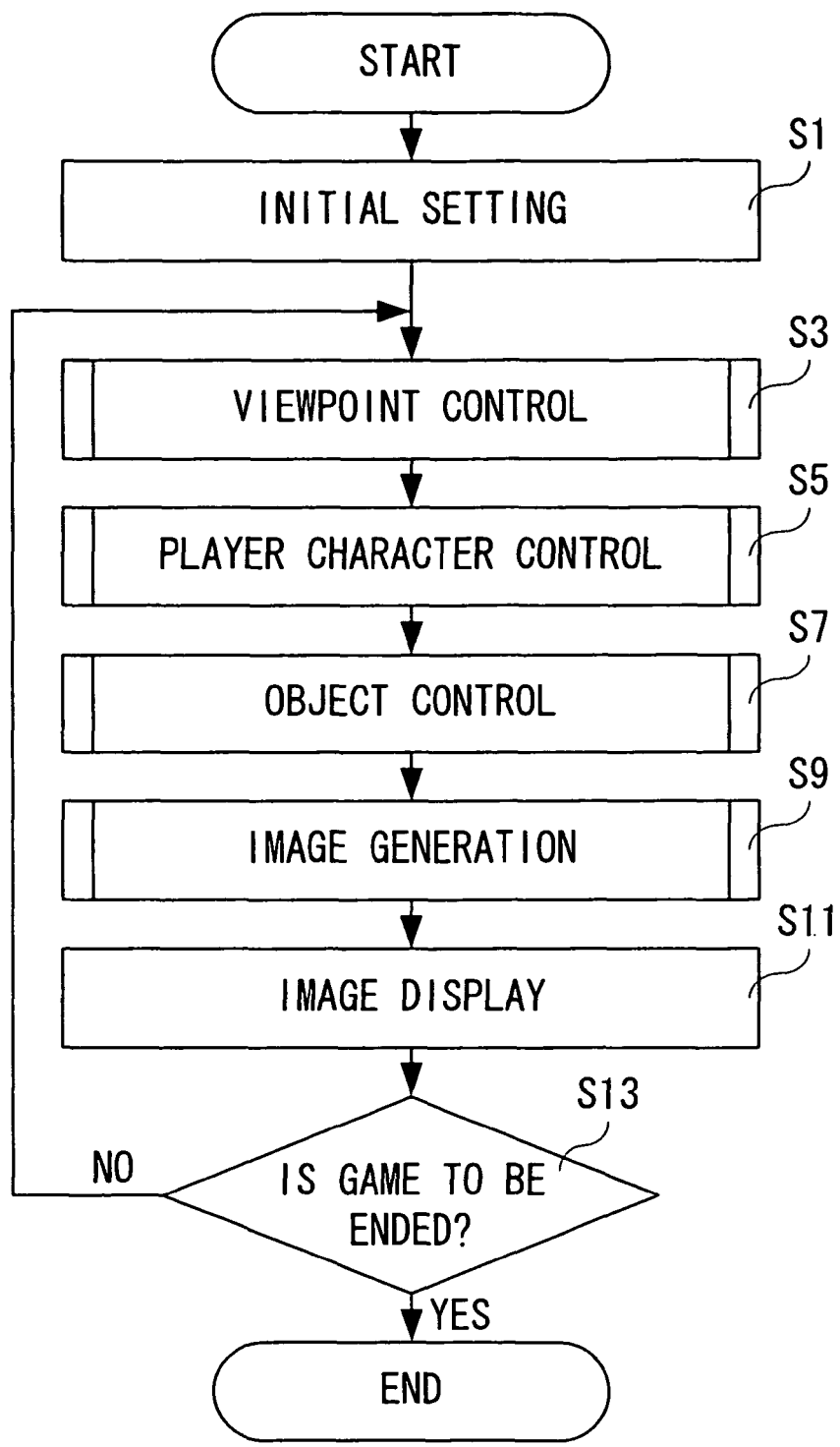
FIG. 10 is a flowchart showing a game entire process of a CPU shown in FIG. 2.

More specifically, the CPU 36 shown in FIG. 2 executes a game entire process shown in FIG. 10. As shown in FIG. 10, the CPU 36 first performs an initial setting in step S1 when starting the game entire process. For example, if the game is started from the top, the buffer area of the main memory 40 is initialized, and an initial value is set to the flag data stored in the main memory 40. Also, if the game is started where the player left off, the game data stored in the memory card 30 is loaded.

Next, in step S3, a viewpoint controlling process (see FIG. 11) described later is executed, and in step S5, a player character controlling process (see FIG. 12) described later is executed. Next, in step S7, an object controlling process (see FIG. 13) described later is executed, and in step S9, an image generating process (see FIG. 16) described later is executed. In the following step, step S11, the image (game image) generated in step S9 is displayed on the monitor 34.

Then, in step S13, it is determined whether or not a game is to be ended. That is, it is determined whether or not a game is over, or whether or not a game end is instructed by the player. If "NO" in step S13, that is, if the game is not to be ended, the process returns to step S3. On the other hand, if "YES" in step S13, that is, if the game is to be ended, the game entire process is directly ended.

Figure 11:
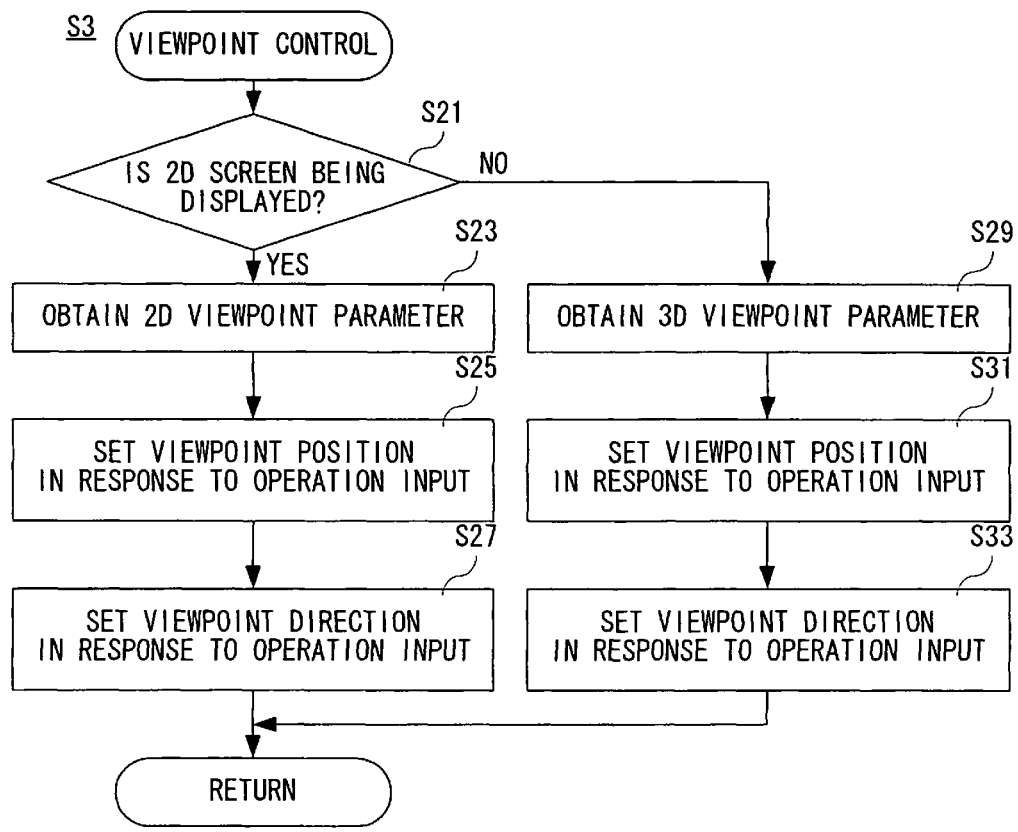
FIG. 11 is a flowchart showing a viewpoint controlling process of the CPU shown in FIG. 2.

FIG. 11 is a flowchart showing a viewpoint controlling process in step S3 shown in FIG. 10. As shown in FIG. 11, the CPU 36 determines whether or not the 2D screen is being displayed in step S21 when starting the viewpoint controlling process. That is, referring to the 2D flag data 404*j*, it is determined whether or not the 2D flag is turned on. If "YES" in step S21, that is, if the 2D flag is turned on, it is determined that the 2D screen is being displayed, and then, the 2D viewpoint parameter data 404*f* is obtained in step S23. Strictly speaking, in step S23, with reference to the player character data 404*c*, the current position of the player character 102 is obtained, and the 2D viewpoint parameter data 404*f* (viewpoint data) stored in correspondence with the current position is obtained.

In the next step, step S25, the position of the viewpoint is set (changed) in response to the operation input, and in step S27, the direction of the viewpoint is set (changed) in response to the operation input, and then, the process returns to the game entire process shown in FIG. 10. It should be noted that if no operation input is present from the player, that is, if the operation data 404*b* is not stored in the data storage area 404, or even if the operation data 404*b* is stored, but it has nothing to do with the viewpoint control, the process in step S25 and step S27 are not executed.

If "NO" in step S21, that is, if the 2D flag is turned off, and a 3D screen is being displayed, the 3D viewpoint parameter data 404*g* is obtained in step S29. Strictly speaking, in step S29, with reference to the player character data 404*c*, the current position of the player character 102 is obtained, and the 3D viewpoint parameter data 404*g* (viewpoint data) stored in correspondence to the current position is obtained.

In the next step, step S31, in response to the operation input, the position of the viewpoint is set (changed), and in step S33, the direction of the viewpoint is set (changed) in response to the operation input, and then, the game entire process is returned. It should be noted that if no operation input is present from the player, that is, if the operation data 404*b* is not stored in the data storage area 404, or even if the operation data 404*b* is stored, but it has nothing to do with the viewpoint control, the process in steps S31 and S33 are not executed.

Figure 12:
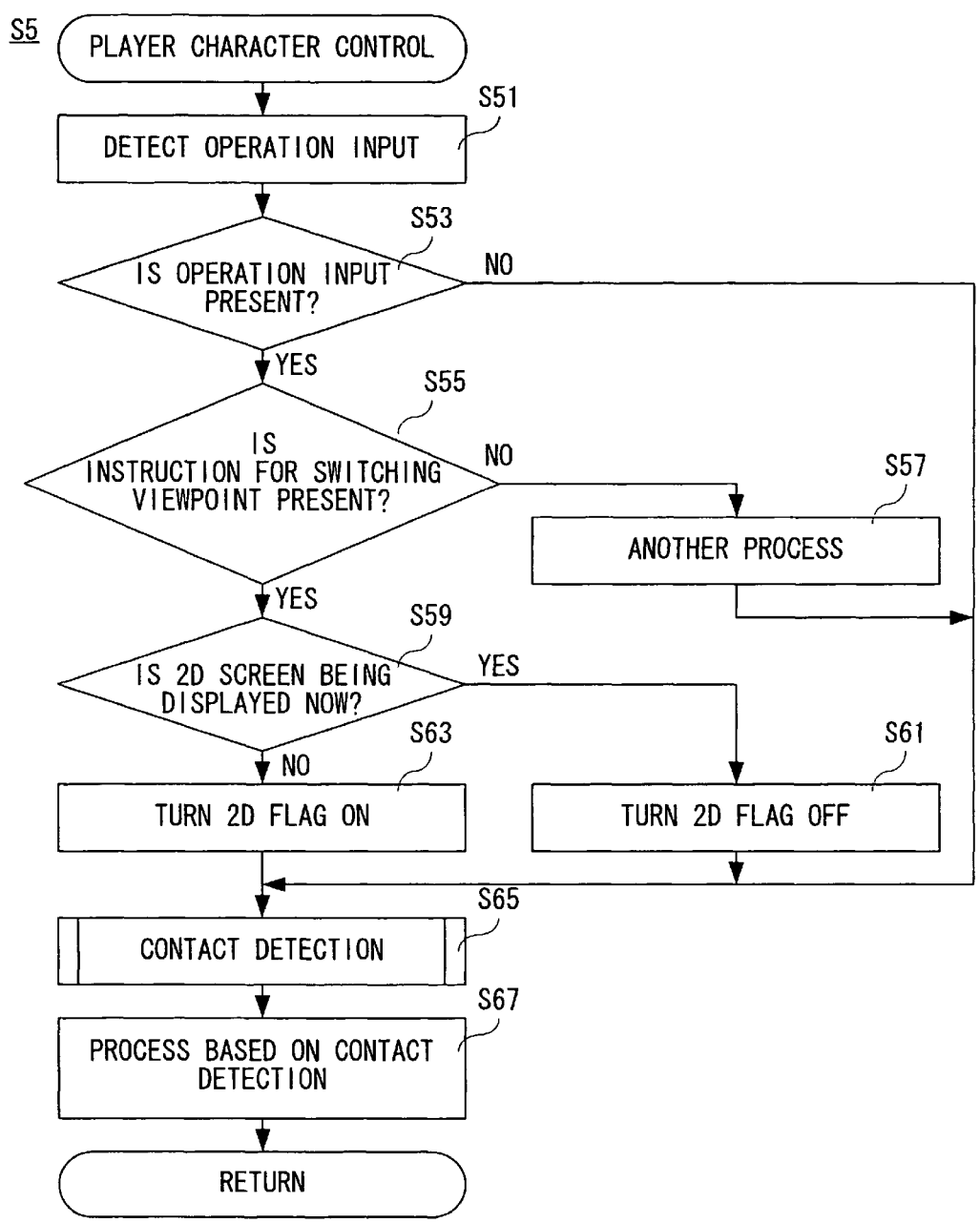
FIG. 12 is a flowchart showing a player character controlling process of the CPU shown in FIG. 2.

FIG. 12 is a flowchart showing a player character controlling process in step S5 shown in FIG. 10. As shown in FIG. 12, the CPU 36 detects an operation input in step S51 when starting the player character controlling process. That is, the data storage area 404 is referred.

In the following step, step S53, it is determined whether or not the operation input is present. That is, it is determined whether or not the operation data 404*b* is stored in the data storage area 404. If "NO" in step S53, that is, if the operation input is not present, the process directly proceeds to step S65. On the other hand, if "YES" in step S53, that is, if the operation input is present, it is determined whether or not the operation input is an instruction for switching the viewpoint in step S55. If "NO" in step S55, that is, if the operation input is not the instruction for switching the viewpoint, another process is executed in step S57, and then, the process proceeds to step S65. For example, in step S57, the player makes the player character 102 move or perform an arbitrary action.

However, if "YES" in step S55, that is, if the operation input is the instruction for switching the viewpoint, it is determined whether or not the 2D screen is being displayed now in step S59. That is, it is determined whether or not the 2D flag is turned on. If "YES" in step S59, that is, if the 2D flag is turned on, the 2D flag is turned off to switch to the 3D screen in step S61, and then, the process proceeds to step S65. On the other hand, if "NO" in step S59, that is, if the 2D flag is turned off, it is determined that the 3D screen is being displayed now, the 2D flag is turned on in order to switch to the 2D screen in step S63, and then, the process proceeds to step S65.

In step S65, a contact detection process (see FIG. 14 and FIG. 15) described later is executed. Then, in step S67, a process based on the contact detection is executed, and then, the process returns to the entire process shown in FIG. 10. For example, in step S67, if the player character 102 contacts the item, it obtains the item. Also, if the player character 102 contacts the enemy character, the player character 102 is damaged, or annihilates the enemy character. According thereto, the life of the player character 102 is subtracted, the point is added, and so forth. In addition, if the player character 102 contacts the ground object 104 and the step object 108, the player character 102 can move on it, or is hindered its progress by the step object 108.

Figure 13:
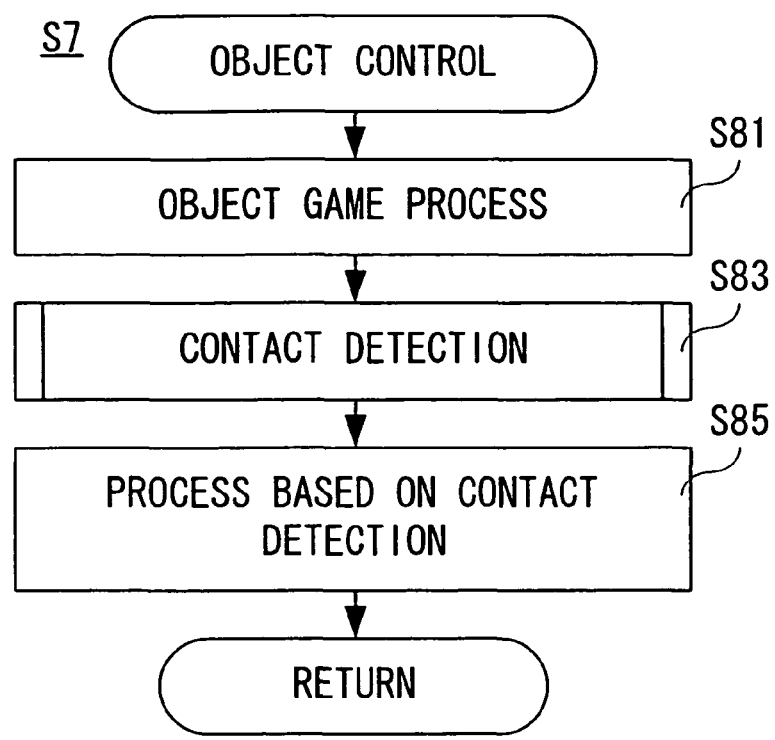
FIG. 13 is a flowchart showing an object controlling process of the CPU shown in FIG. 2.

FIG. 13 is a flowchart showing an object controlling process in step S7 shown in FIG. 10. As shown in FIG. 13, when the object controlling process is started, an object game process is executed in step S81. This makes the enemy character appear or move, and makes an item appear and disappear. In the next step, step S83, a contact detection process described later is executed. Then, in step S85, a process based on the contact detection is executed to return to the entire process shown in FIG. 10.

It should be noted that the process in step S85 is similar to the above-described player character controlling process (FIG. 12) in step S67.

Figure 14:
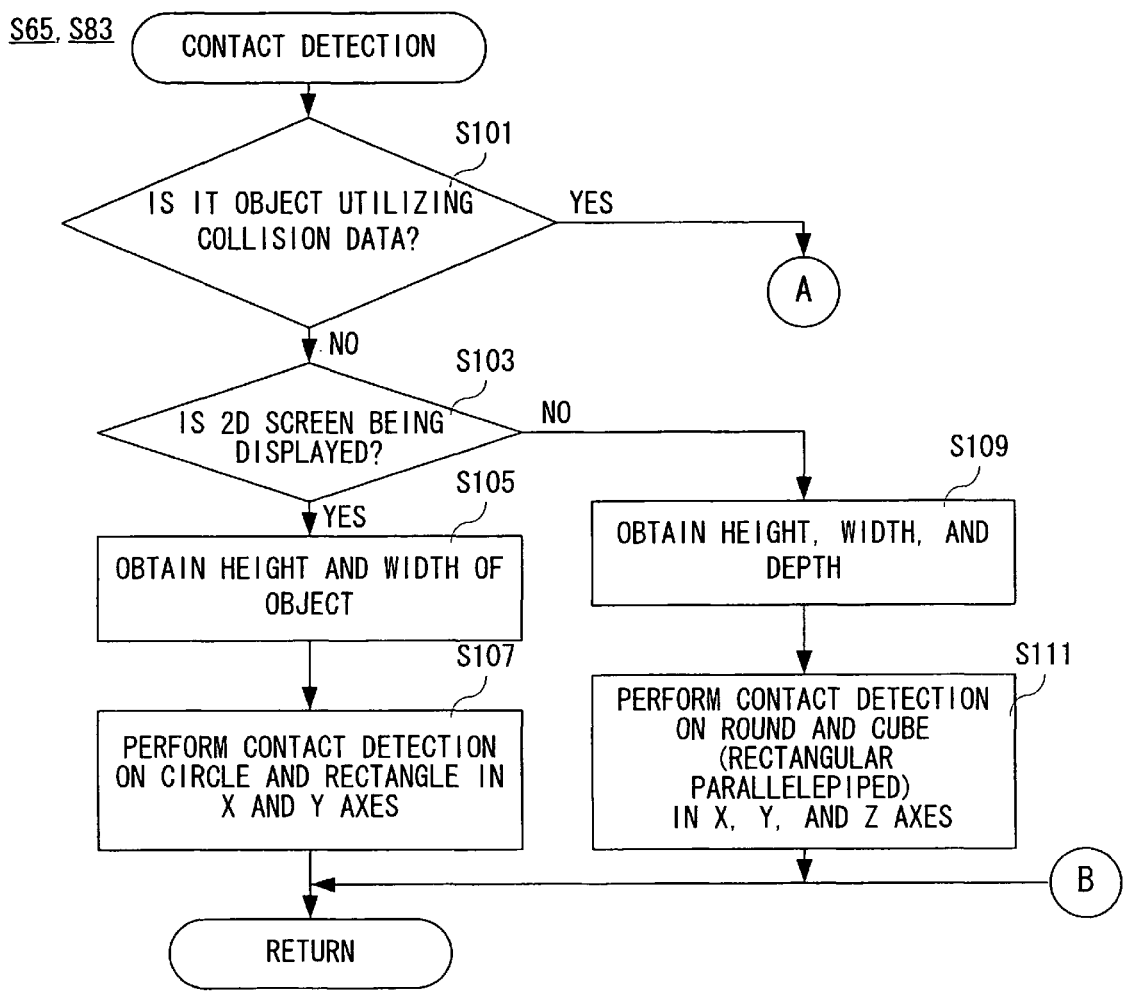
FIG. 14 is a flowchart showing a part of a contact detection process of the CPU shown in FIG. 2.
Figure 15:
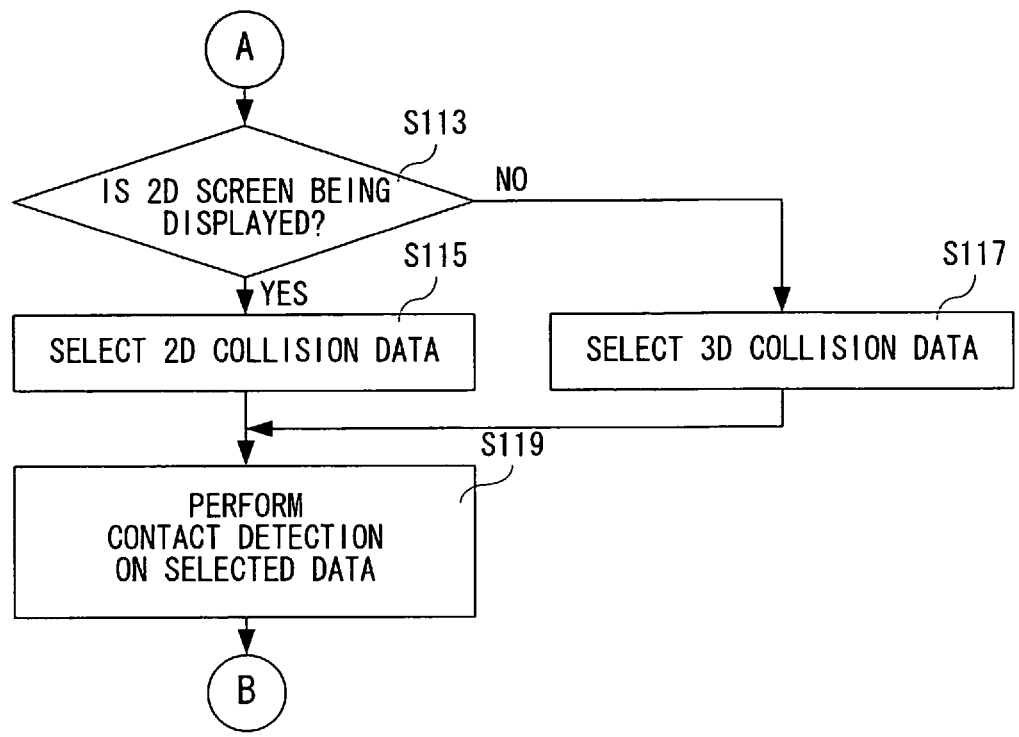
FIG. 15 is a flowchart showing another part of the contact detection process of the CPU shown in FIG. 2.

FIG. 14 and FIG. 15 is a flowchart showing the contact detection process in step S65 in FIG. 12 and in step S83 in FIG. 13. As shown in FIG. 14, the CPU 36 determines whether or not an object is an object utilizing the collision data in step S101 when the contact detection process is started. That is, it is determined whether or not the collision data is prepared (stored) with respect to the object on which a contact detection is performed. If "YES" in step S101, that is, if the object is an object utilizing the collision data, the process proceeds to step S113 shown in FIG. 15. However, if "NO" in step S101, that is, if the object is not an object utilizing the collision data, it is determined whether or not the 2D screen is being displayed with reference to the 2D flag data 404j in step S103.

If "YES" in the step S103, that is, if the 2D screen is being displayed, the height and the width of the object is obtained in step S105, a contact detection is performed on the circle and the rectangle in the X and Y axes in step S107, and then, the contact detection process is returned. On the other hand, if "NO" in step S103, that is, if the 3D screen is being displayed, the height, width and depth of the object are obtained in step S109, a contact detection is performed on the round and cube (rectangular parallelepiped) in the X, Y, and Z axes in step S111, and then, the contact detection process is returned.

As shown in FIG. 15, it is determined whether or not the 2D screen is being displayed in step S113. If "YES" in step S113, that is, if the 2D screen is being displayed, the 2D collision data 404h is selected (read) in step S115, and then, the process proceeds to step S119. On the other hand, if "NO" in step S113, that is, if the 3D screen is displayed, the 3D collision data 404i is selected (read) in step S117, and then, the process proceeds to step S119. In step S119, a contact detection is performed on the selected (read) data, and then, a contact detection process is returned as shown in FIG. 14.

Figure 16:
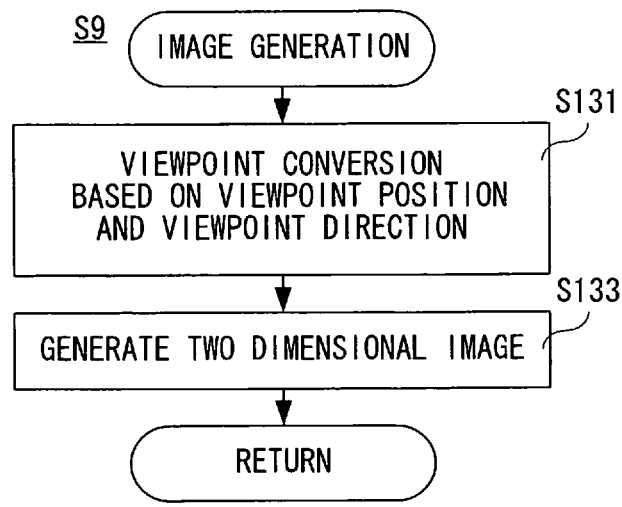
FIG. 16 is a flowchart showing an image generating process of the CPU shown in FIG. 2.

FIG. 16 is a flowchart showing an image generating process in step S9 shown in FIG. 10. As shown in FIG. 16, when starting an image generating process, the CPU 36 executes a viewpoint transformation on the basis of the position of the viewpoint and the direction of the viewpoint in step S131. That is, with reference to the viewpoint data 404e stored in the data storage area 404 of the main memory 40, the current position of the viewpoint and direction of the viewpoint are obtained so as to be converted into camera coordinates, regarding the current viewpoint (camera position) as an original point, and the current direction of viewpoint as the z-axis direction of the camera coordinates. Then, in step S133, a two dimensional image is generated, and then, the entire process is returned as shown in FIG. 10. In step S133, a virtual three-dimensional space viewed from the viewpoint is focused on a virtual screen, that is, converted into the camera coordinates to generate a two-dimensional image.

According to this exemplary embodiment, the 2D collision data and the 3D collision data are prepared in correspondence with a predetermined object, and a contact detection is performed by utilizing any one of them. Thus, the player can enjoy playing a pseudo 2D game in the 3D game, and gain interest of the game utilizing the properties of the 2D game and the 3D game. Also, by not only combining the 2D game and the 3D game, but by also unifying them, it becomes possible to provide a greater decrease in processing load and to provide an increase in available memory than when combining both of them.

It should be noted that, in this exemplary embodiment, although in a case that the 2D game screen is displayed, by neglecting the z-axis direction, a contact detection is performed on only the x-axis direction and the y-axis direction, although it is not limited thereto. For example, a contact detection may be performed on only the x-axis direction by neglecting the y-axis direction and the z-axis direction, and a contact detection may also be performed on only the y-axis direction by neglecting the x-axis direction and the z-axis direction. That is, for each virtual game, any detection method may be applicable.

Furthermore, in this exemplary embodiment, although a description is made on a game system which is separately provided with a video game apparatus and a monitor, it is needless to say that the present invention is applicable to a hand-held type game apparatus integrally provided with the monitor, an arcade game, a hand-held phone having a game function.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A game apparatus having an operating member with which a player makes an operation input, a display for displaying a game image, and a storage location for storing in advance data for generating at least a virtual three-dimensional space defined by coordinate systems, comprising:

input detecting programmed logic circuitry for detecting input data corresponding to an operation input from said operating member, and temporarily storing it in said storage location;

player character controlling programmed logic circuitry for arranging a player character to be operated by the player in said virtual three-dimensional space by utilizing player character data stored in said storage location in response to first input data temporarily stored by said input detecting programmed logic circuitry;

object controlling programmed logic circuitry for arranging an object not to be operated by the player in said virtual three-dimensional space by utilizing object data stored in said storage location;

contact detection programmed logic circuitry for detecting that said player character and a predetermined object are in contact with each other;

viewpoint controlling programmed logic circuitry for controlling a viewpoint in said virtual three-dimensional space; and viewpoint switching programmed logic circuitry for switching said viewpoint depending on second input data temporarily stored by said input detecting programmed logic circuitry, wherein said contact detection programmed logic circuitry changes contact detection data set to said predetermined object depending on a switching result of said viewpoint switching programmed logic circuitry, said contact detection data includes first detection data for performing a contact detection on all the coordinate systems defining the virtual three-dimensional space and second detection data for performing a contact detection in one or a combination of any two of the coordinates systems defining said virtual three-dimensional space, and said contact detection programmed logic circuitry selects any one of said first detection data and said second detection data depending on a switching result of said viewpoint switching programmed logic circuitry.

2. A game apparatus according to claim 1, further comprising:

mode switching programmed logic circuitry for switching between a first mode for switching a view point as to all the coordinates systems defining said virtual three-dimensional space by said viewpoint switching programmed logic circuitry and a second mode for switching a viewpoint in one or a combination of any two of said coordinates systems defining said virtual three-dimensional space by said viewpoint switching programmed logic circuitry, wherein said contact detection programmed logic circuitry selects said first detection data when said mode switching programmed logic circuitry switches to said first mode, and said contact detection programmed logic circuitry selects said second detection data when said mode switching programmed logic circuitry switches to said second mode.

3. A non-transitory storage medium storing a game program of a game apparatus having an operating member with which a player makes an operation input, a display for displaying a game image, and a storage location for storing in advance data for generating at least a virtual three-dimensional space defined by coordinate systems, said game program causing a processor of said game apparatus to execute instructions, comprising:

detecting input data corresponding to an operation input from said operating member, and temporarily storing said detected input data in said storage location;

arranging a player character to be operated by the player in said virtual three-dimensional space by utilizing the player character data stored in said storage location in response to first input data temporarily stored during said input detecting;

arranging an object not to be operated by the player in said virtual three-dimensional space by utilizing the object data stored in said storage location;

detecting that said player character and the predetermined object are in contact with each other;

controlling a viewpoint in said virtual three-dimensional space; and switching said viewpoint depending on second input data temporarily stored during said input detecting, wherein contact detection data set during said contact detecting is changed to said predetermined object depending on a switching result of said viewpoint switching, said contact detection data includes first detection data for performing a contact detection on all the coordinate systems defining the virtual three-dimensional space and second detection data for performing a contact detection in one or a combination of any two of the coordinates systems defining said virtual three-dimensional space, and any one of said first detection data and said second detection data is selected during said contact detecting depending on a switching result of said viewpoint switching.

4. A non-transitory storage medium storing a game program of a game apparatus according to claim 3, wherein said game program is further configured to cause the processor of said game apparatus to execute instructions comprising:

switching between a first mode for switching a view point as to all the coordinates systems defining said virtual three-dimensional space, and a second mode for switching a viewpoint in one or a combination of any two of said coordinates systems defining said virtual three-dimensional space, wherein said first detection data is selected via said contact detecting when said mode switching switches to said first mode, and said second detection data is selected via said contact detecting when said mode switching switches to said second mode.

5. A method of operating a game apparatus having an operating member with which a player is able to make an input, a display for displaying a game image, and a storage location for storing in advance data for generating at least a virtual three-dimensional space defined by coordinate systems, the method comprising:

detecting input data corresponding to an operation input from said operating member, and temporarily storing said detected input data in said storage location;

arranging a player character to be operated by the player in said virtual three-dimensional space by utilizing the player character data stored in said storage location in response to first input data temporarily stored during said input detecting;

arranging an object not to be operated by the player in said virtual three-dimensional space by utilizing the object data stored in said storage location;

detecting that said player character and the predetermined object are in contact with each other;

controlling a viewpoint in said virtual three-dimensional space; and switching said viewpoint depending on second input data temporarily stored during said input detecting, wherein contact detection data set during said contact detecting is changed to said predetermined object depending on a switching result of said viewpoint switching, said contact detection data includes first detection data for performing a contact detection on all the coordinate systems defining the virtual three-dimensional space and second detection data for performing a contact detection in one or a combination of any two of the coordinates systems defining said virtual three-dimensional space, and any one of said first detection data and said second detection data is selected during said contact detecting depending on a switching result of said viewpoint switching.

6. A method according to claim 5, further comprising:

switching between a first mode for switching a view point as to all the coordinates systems defining said virtual three-dimensional space, and a second mode for switching a viewpoint in one or a combination of any two of said coordinates systems defining said virtual three-dimensional space, wherein said first detection data is selected via said contact detecting when said mode switching switches to said first mode, and said second detection data is selected via said contact detecting when said mode switching switches to said second mode.

7. A game apparatus having an operating member with which a player makes an operation input, a display for displaying a game image, and a storage location for storing in advance data for generating at least a virtual three-dimensional space defined by coordinate systems, comprising:

input detecting programmed logic circuitry for detecting input data corresponding to an operation input from said operating member, and temporarily storing it in said storage location;

player character controlling programmed logic circuitry for arranging a player character to be operated by the player in said virtual three-dimensional space by utilizing player character data stored in said storage location in response to first input data temporarily stored by said input detecting programmed logic circuitry;

object controlling programmed logic circuitry for arranging an object not to be operated by the player in said virtual three-dimensional space by utilizing object data stored in said storage location;

contact detection programmed logic circuitry for detecting that said player character and a predetermined object are in contact with each other, regardless of whether a game program being executed by the game apparatus is being operated in a two- or three-dimensional game space mode;

viewpoint controlling programmed logic circuitry for controlling a viewpoint in said virtual three-dimensional space; and viewpoint switching programmed logic circuitry for switching said viewpoint depending on second input data temporarily stored by said input detecting programmed logic circuitry, wherein said contact detection programmed logic circuitry changes contact detection data set to said predetermined object depending on a switching result of said viewpoint switching programmed logic circuitry.

8. A game apparatus according to claim 7, wherein:

said contact detection data includes first detection data for performing a contact detection on all the coordinate systems defining a virtual three-dimensional space and second detection data for performing a contact detection in one or a combination of any two of the coordinates systems defining said virtual three-dimensional space, and said contact detection programmed logic circuitry selects any one of said first detection data and said second detection data depending on a switching result of said viewpoint switching programmed logic circuitry.

9. A game apparatus according to claim 8, further comprising:

mode switching programmed logic circuitry for switching between a first mode for switching a view point as to all the coordinates systems defining said virtual three-dimensional space by said viewpoint switching programmed logic circuitry and a second mode for switching a viewpoint in one or a combination of any two of said coordinates systems defining said virtual three-dimensional space by said viewpoint switching programmed logic circuitry, wherein said contact detection programmed logic circuitry selects said first detection data when said mode switching programmed logic circuitry switches to said first mode, and said contact detection programmed logic circuitry selects said second detection data when said mode switching programmed logic circuitry switches to said second mode.

10. A system comprising an operating member by which a player provides an operation input, a display for displaying a game image, and a storage location for storing in advance data for generating at least a virtual three-dimensional space defined by coordinate systems, the system further comprising:

input detecting programmed logic circuitry configured to detect input data corresponding to an operation input from said operating member, and temporarily storing it in said storage location;

player character controlling programmed logic circuitry configured to arrange a player character to be operated by the player in said virtual three-dimensional space by utilizing player character data stored in said storage location in response to first input data temporarily stored by said input detecting programmed logic circuitry;

object controlling programmed logic circuitry configured to arrange an object not operable by the player in said virtual three-dimensional space by utilizing object data stored in said storage location;

contact detection programmed logic circuitry configured to detect when said player character and a predetermined object are in contact with each other;

viewpoint controlling programmed logic circuitry configured to control a viewpoint in said virtual three-dimensional space; and viewpoint switching programmed logic circuitry configured to switch said viewpoint depending on second input data temporarily stored by said input detecting programmed logic circuitry, wherein said contact detection programmed logic circuitry is configured to change contact detection data set to said predetermined object depending on a switching result of said viewpoint switching programmed logic circuitry, said contact detection data includes first detection data for performing a contact detection on all the coordinate systems defining the virtual three-dimensional space and second detection data for performing a contact detection in one or a combination of any two of the coordinates systems defining said virtual three-dimensional space, and said contact detection programmed logic circuitry is configured to select any one of said first detection data and said second detection data depending on a switching result of said viewpoint switching programmed logic circuitry.

11. A system according to claim 10, further comprising:

mode switching programmed logic circuitry configured to switch between a first mode for switching a view point as to all the coordinates systems defining said virtual three-dimensional space by said viewpoint switching programmed logic circuitry and a second mode for switching a viewpoint in one or a combination of any two of said coordinates systems defining said virtual three-dimensional space by said viewpoint switching programmed logic circuitry, wherein said contact detection programmed logic circuitry is configured to select said first detection data when said mode switching programmed logic circuitry switches to said first mode, and said contact detection programmed logic circuitry is configured to select said second detection data when said mode switching programmed logic circuitry switches to said second mode.

* * * * *